United States Patent
Ueshima et al.

(10) Patent No.: US 7,662,047 B2
(45) Date of Patent: Feb. 16, 2010

(54) INFORMATION PROCESSOR HAVING INPUT SYSTEM USING STROBOSCOPE

(75) Inventors: Hiromu Ueshima, Shiga (JP); Katsuya Nakagawa, Shiga (JP)

(73) Assignee: SSD Company Limited, Shiga (JP)

( * ) Notice: Subject to any disclaimer, the term of this patent is extended or adjusted under 35 U.S.C. 154(b) by 652 days.

(21) Appl. No.: 10/517,767

(22) PCT Filed: Jun. 20, 2003

(86) PCT No.: PCT/JP03/07900

§ 371 (c)(1),
(2), (4) Date: Dec. 23, 2004

(87) PCT Pub. No.: WO2004/002593

PCT Pub. Date: Jan. 8, 2004

(65) Prior Publication Data

US 2005/0239548 A1  Oct. 27, 2005

(30) Foreign Application Priority Data

Jun. 27, 2002 (JP) ............................. 2002-187162
Nov. 28, 2002 (JP) ............................. 2002-346052

(51) Int. Cl.
A63B 57/00 (2006.01)

(52) U.S. Cl. .................. 473/199; 473/150; 473/151; 473/198; 473/219; 473/220; 473/221; 473/407; 463/3; 463/36; 345/156

(58) Field of Classification Search .............. 473/150, 473/151, 198, 199, 219–221, 407; 463/3, 463/36; 345/156
See application file for complete search history.

(56) References Cited

U.S. PATENT DOCUMENTS

| 2,223,849 | A | * | 12/1940 | Fogler et al. ............... 283/115 |
| 3,577,153 | A | * | 5/1971 | Yagi et al. .................... 348/371 |
| 4,713,686 | A | * | 12/1987 | Ozaki et al. ................. 348/157 |
| 5,056,791 | A | * | 10/1991 | Poillon et al. ............... 473/156 |
| 5,111,410 | A | * | 5/1992 | Nakayama et al. .......... 434/258 |
| 5,249,967 | A | * | 10/1993 | O'Leary et al. ............. 434/247 |
| 5,288,080 | A | * | 2/1994 | Tice ........................... 473/220 |
| 5,471,383 | A | * | 11/1995 | Gobush et al. ............... 700/91 |

(Continued)

FOREIGN PATENT DOCUMENTS

EP   837418 A2   4/1998

(Continued)

OTHER PUBLICATIONS

Japanese office Action dated Dec. 24, 2008, 3 pgs.

Primary Examiner—John M Hotaling
Assistant Examiner—Milap Shah
(74) Attorney, Agent, or Firm—Arent Fox LLP

(57) ABSTRACT

A stroboscope is utilized as an input device of a golf game system (10), for example. The golf game system includes a game machine (12) as an information processing apparatus and a golf-club-shaped input device (14), and within a housing of the game machine, an imaging unit (28) is housed, and the imaging unit is provided with an image sensor (40) and an infrared-LED. By utilizing the infrared-LED, an infrared ray is intermittently emitted to a predetermined range of an upper portion of the imaging unit. Accordingly, the image sensor intermittently images a reflective body provided in the golf-club-shaped input device moving within the range. Such the stroboscope image processing of the reflective body enables calculation of a velocity, and so on as an input of the game machine.

36 Claims, 36 Drawing Sheets

U.S. PATENT DOCUMENTS

| | | | |
|---|---|---|---|
| 5,472,205 A * | 12/1995 | Bouton | 473/222 |
| 5,478,239 A * | 12/1995 | Fuerst et al. | 473/438 |
| 5,501,463 A * | 3/1996 | Gobush et al. | 473/199 |
| 5,803,823 A * | 9/1998 | Gobush et al. | 473/223 |
| 5,833,549 A * | 11/1998 | Zur et al. | 473/199 |
| 6,041,651 A * | 3/2000 | Naruo et al. | 73/491 |
| 6,042,483 A * | 3/2000 | Katayama | 473/199 |
| 6,144,366 A * | 11/2000 | Numazaki et al. | 345/156 |
| 6,227,984 B1 * | 5/2001 | Blankenship | 473/221 |
| 6,292,169 B1 * | 9/2001 | Numazaki et al. | 345/156 |
| 6,506,124 B1 * | 1/2003 | Manwaring et al. | 473/198 |
| 6,579,190 B2 * | 6/2003 | Yamamoto | 473/141 |
| 6,672,978 B1 * | 1/2004 | Morgan et al. | 473/407 |
| 6,821,211 B2 * | 11/2004 | Otten et al. | 473/219 |
| 7,022,026 B2 * | 4/2006 | Blankenship | 473/221 |
| 7,086,954 B2 * | 8/2006 | Gobush et al. | 473/198 |
| 2002/0098897 A1 * | 7/2002 | Manwaring | 473/151 |
| 2004/0043839 A1 * | 3/2004 | Inoue et al. | 473/407 |
| 2005/0124413 A1 * | 6/2005 | Ueshima | 463/30 |
| 2005/0140645 A1 * | 6/2005 | Ueshima | 345/156 |
| 2006/0140485 A1 * | 6/2006 | Hing et al. | 382/219 |

FOREIGN PATENT DOCUMENTS

| | | |
|---|---|---|
| JP | 04086958 A * | 3/1992 |
| JP | 4-241885 A | 8/1992 |
| JP | 06-086174 | 3/1994 |
| JP | 07-154777 | 6/1995 |
| JP | 08-287216 | 1/1996 |
| JP | 08-112449 | 5/1996 |
| JP | 09215807 A * | 8/1997 |
| JP | 10-222285 | 8/1998 |
| JP | 2001-209487 | 8/2001 |
| JP | 2001-222375 | 8/2001 |
| JP | 2002-027315 | 1/2002 |

* cited by examiner

FIG. 30

SCORE SHEET

| | 1 | | 2 | | 3 | | 4 | 5 | 6 | 7 | 8 | 9 | 10 | |
|---|---|---|---|---|---|---|---|---|---|---|---|---|---|---|
| A B C | G | – | 1 | 2 | 3 | 4 | | | | | | | | |
| | 0 | | 3 | | 10 | | | | | | | | | |
| | 1 | | 2 | | 3 | | 4 | 5 | 6 | 7 | 8 | 9 | 10 | |
| D E F | 6 | 1 | 5 | 2 | 3 | 3 | | | | | | | | |
| | 8 | | 15 | | 21 | | | | | | | | | |
| | 1 | | 2 | | 3 | | 4 | 5 | 6 | 7 | 8 | 9 | 10 | |
| G H I | 1 | G | 3 | 5 | 5 | 1 | | | | | | | | |
| | 8 | | 9 | | 15 | | | | | | | | | |
| | 1 | | 2 | | 3 | | 4 | 5 | 6 | 7 | 8 | 9 | 10 | |
| J K L | 9 | 0 | 3 | 2 | 7 | 2 | | | | | | | | |
| | 9 | | 14 | | 23 | | | | | | | | | |

110

INFORMATION PROCESSOR HAVING INPUT SYSTEM USING STROBOSCOPE

CROSS-REFERENCE TO RELATED APPLICATION

This application is a National Stage entry of International Application No. PCT/JP03/07900, filed Jun. 20, 2003, the entire specification claims and drawings of which are incorporated herewith by reference.

TECHNICAL FIELD

The present invention relates to an information processing apparatus provided with an input system utilizing a stroboscope. More specifically, the present invention relates to an information processing apparatus that processes an image signal of an object irradiated by the stroboscope. Furthermore, the present invention relates to an entertainment apparatus such as a game apparatus, etc. provided with an input system utilizing a stroboscope. In addition, the present invention relates to a man-machine interface system provided with an input system utilizing a stroboscope.

PRIOR ART

The applicant of this invention proposes that in the Patent Literature 1, and so on sensory video game machines in which change in acceleration of a bat or a racket in a real space is detected by use of a piezoelectric buzzer so as to be used as a game input. In such the sensory video game machines, when the change in acceleration is equal to or more than a predetermined amount, it is determined that the game player operates (swings) an object (bat or racket in the above-described example) in the real space.

Patent Literature 1: Japanese Patent Laying-open No. 2001-104636

Patent Literature 2: Japanese Patent Laying-open No. 2002-231489

Patent Literature 3: Japanese Patent Laying-open No. 7-141101

However, depending on the kind of the game, information indicative of which position, which velocity, or which direction the operation is performed as well as whether or not the object is performed, that is, whether or not the acceleration is applied to the object may be required. In the input device disclosed in the Patent Literature 1, it is impossible to fulfill such the requirement.

On the other hand, if imaging the object by utilizing the stroboscope disclosed in the Patent Literature 2, for example, by analyzing an image signal, the position and the velocity of the object as described above can be obtained. However, in the Patent Literature 2, the stroboscope is only disclosed, and the Patent Literature 2 does not provide a specific method of imaging an object by use of the stroboscope, and analyzing in real time an image signal obtained through it.

It is noted that the Patent Literature 3 discloses that an object is extracted from an imaged image signal to obtain the position of the object, and the position information is used as an input of game apparatuses or computers. However, this method works well in a specific use environment, but it is very difficult to obtain accurate position information in a room at a general home where game machines are used. This is because all of the illuminations in the room, windows, objects in various colors, and moving objects except for the game player exert an influence as noise and disturbance on the detection accuracy. In order to accurately detect the position of the object with the influence of the noise and the disturbance reduced, a high-speed processor is necessary, and this is unrealistic for the information processing apparatus with restricted processing ability and at low costs.

SUMMARY OF THE INVENTION

Therefore, it is a primary object of the present invention to provide a novel information processing apparatus, an entertainment apparatus, and a man-machine interface system that are able to apply an input in real time to a computer or a game machine by use of a stroboscope.

The present invention relates to an information processing apparatus provided with an input system utilizing a stroboscope, and comprises a stroboscope; an imaging means for imaging an object at a light-emission and at a non-light-emission of the stroboscope to output an image signal at light-emission and an image signal at non-light emission; a first means for calculating a part or all of information of a position, a size, a velocity, an acceleration, a moving path pattern of the object on the basis of differences between the plurality of image signals at light-emission and the plurality of image signals at non-light emission; and a second means for performing information processing on the basis of the information calculated by the first means.

The above-described first means may include a determination means for determining whether or not the information is coincident with a predetermined condition.

In one embodiment, the first means includes a valid input detecting means for detecting only valid information out of the information on the basis of the determination result by the determination means, and transmitting to the second means as the valid information being performed.

Furthermore, the first means includes a distance calculating means for calculating a distance between the object and the imaging means from the information indicative of the size of the object.

In addition, the first means includes an analyzing means for analyzing information obtained from a difference between the image signal at light-emission and the image signal at non-light emission to extract the shape of the object, and an angle calculating means for calculating an angle between the object and the imaging means from the shape.

The analysis by the above-described analyzing means is for extracting predetermined two points within the object, and the calculation of the angle by the angle calculating means is for calculating an angle between a line segment between predetermined two points and a predetermined coordinate axis.

In an embodiment, a time interval of the light-emission of the stroboscope is freely configurable.

Furthermore, a length of the light-emission period and a length of the non-light-emission period of the stroboscope are freely configurable.

In addition, an exposure period of the imaging means is freely configurable.

In one embodiment, the object includes a reflective body.

Furthermore, the stroboscope includes a light source for outputting a light having a specific wavelength range, and the imaging means is made to respond to only the specific wavelength range.

In this case, the imaging means includes a filter for passing only the light with the specific wavelength range and an imaging device for imaging an image formed by the light passed through the filter.

In another embodiment, the imaging means includes an imaging device for imaging only the image formed by the light having the specific wavelength range.

Each of the first means and the second means described above is process to be processed by a single or a plurality of processors.

Then, the image processing performed by such the second means is an entertainment process such as a game, etc.

A man-machine interface system provided with an input system by utilizing a stroboscope comprises a stroboscope; an imaging means for outputting an image signal at a light-emission and an image signal at a non-light emission by imaging an object at a light-emission of the stroboscope and at a non-light-emission; a first means for calculating a part or all of information of a position, a size, a velocity, an acceleration, a moving path pattern on the basis of differences between the plurality of image signals at a light-emission and a plurality of image signals at a non-light emission; and a second means for performing image processing on the basis of the information calculated by the first means.

According to the invention, by the stroboscope (42, 52: reference numerals of elements or components corresponding in the embodiments, and so forth), the object (14, 94, 112) is brightly irradiated to heighten a contrast between the object and things except for the object as an imaging result, and therefore, it becomes easy to detect the object. Furthermore, the first means (52, S59, S129, FIG. 35: S61, FIG. 22, FIG. 25, FIG. 33) calculates the differences between the plurality of image signals at light-emission and the plurality of image signals at non-light emission, and whereby, it becomes possible to detect the position, the size, the velocity, the moving path pattern of the object with accuracy and with simple image processing while reducing an influence of noise component due to a still image except for the object being a moving object, a fixed light source, and etc. On the basis of the information thus calculated, the second means (52, S63) performs the predetermined information processing.

Then, by separating the information processing for calculating these information and the information processing at the application side, it is possible to make the information processing at the application side simple, and at a time of replacing the information processing at the application side with another processing, the processing for calculating the position, the size, the velocity, the acceleration, the moving path pattern of the object can be utilized without being changed.

In a case of utilizing the determination means, the determination means (52, S61, FIG. 22, FIG. 25, FIG. 33) determines whether or not the position, the size, the velocity, the acceleration, the moving path pattern of the object are coincident with the predetermined condition, and in the information processing at the application side, with reference to the determination result, if the information is not coincident with the predetermined condition, the calculated information is not received, capable of performing simple application processing.

More specifically, the valid input detecting means (52, FIG. 22, FIG. 25, FIG. 33) included in the first means makes a choice of the information on the basis of the determination result by the determination means, and transmits only the valid input from the user to the information processing at the application side. Therefore, it becomes possible to perform simple application processing.

In a case of utilizing the distance calculating means, the distance calculating means (52, S111, S113) included in the first means calculates the size of the object from the imaging result, and calculates the distance between the object and the imaging means on the basis of the calculated size information. Thus, from the two-dimensional imaging result, the position, the velocity, the acceleration, and the moving path pattern in the three-dimensional space can be obtained.

In a case that the first means includes the analyzing means (52, FIG. 24: S159-S167) and the angle calculating means (52, S169), by analyzing the shape of the object from the imaging result, the angle formed by the object projected on the two-dimensional image as the imaging result and the imaging means can be obtained.

The analyzing means performs the analysis (S166) for extracting the two predetermined points within the object, and the angle calculation executed by the angle calculating means is for calculating the angle between the line segment between the predetermined two points and the predetermined coordinate axis.

For example, as shown in FIG. 6 embodiment, by controlling lighting/lights-out of the infrared-LED by the processor, it becomes possible to perform the light-emission of the strobe light source and the exposure by the imaging means only at a necessary time interval and at a necessary timing, capable of reducing electric power consumption.

If the object includes the reflective body (50, 50A, 100, 116), a contrast between the object and other images are further enhanced, capable of improving accuracy of the detection with an inexpensive configuration.

In a case of responding to the specific wavelength, the stroboscope includes the light source (the infrared-LED 42, for example) outputting the light having the specific wavelength range, and the imaging means responds only to the specific wavelength range by utilizing the infrared filter. Therefore, rendering the light having the wavelength that the moving light source and blinking light source (fluorescent lamp, etc.) except for the object to be detected do not have the light source of the stroboscope, it is possible to remove the noise light sources.

In the embodiment, each of the first means and the second means is a process to be processed by a single or a plurality of processors (processors for processing 52 and/or 63). Thus, the first means and the second means are rendered processes to be processed as software of the processor, capable of establishing a system with low prices and with high flexibility. It is noted that it is further desirable that the processes of both of the first means and the second means are executed by a single processor.

Then, the image processing performed by the second means is an entertainment process such as a game, etc.

By utilizing the man-machine interface according to this invention as a man-machine interface for a personal computer, a workstation, game equipment, educational equipment, medical equipment, etc., it is possible to establish the input system with low prices and with high degree of precision.

According to this invention, by digitally analyzing the imaging result of the object irradiated by the stroboscope, the information such as the position, the size, the velocity, the acceleration, the moving path pattern of the object can be used as inputs to the information processing apparatus.

Furthermore, with simple information processing, it is possible to perform detection independent of the noise or the disturbance with high degree of precision, and therefore, it becomes possible to use on a system restricted in performance depending on the condition such as prices, allowable electric power consumption, etc.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 30 is an illustrative view showing one example of a score sheet to be displayed on the television monitor in FIG. 27 embodiment;

BEST MODE FOR PRACTICING THE INVENTION

Figure 2:
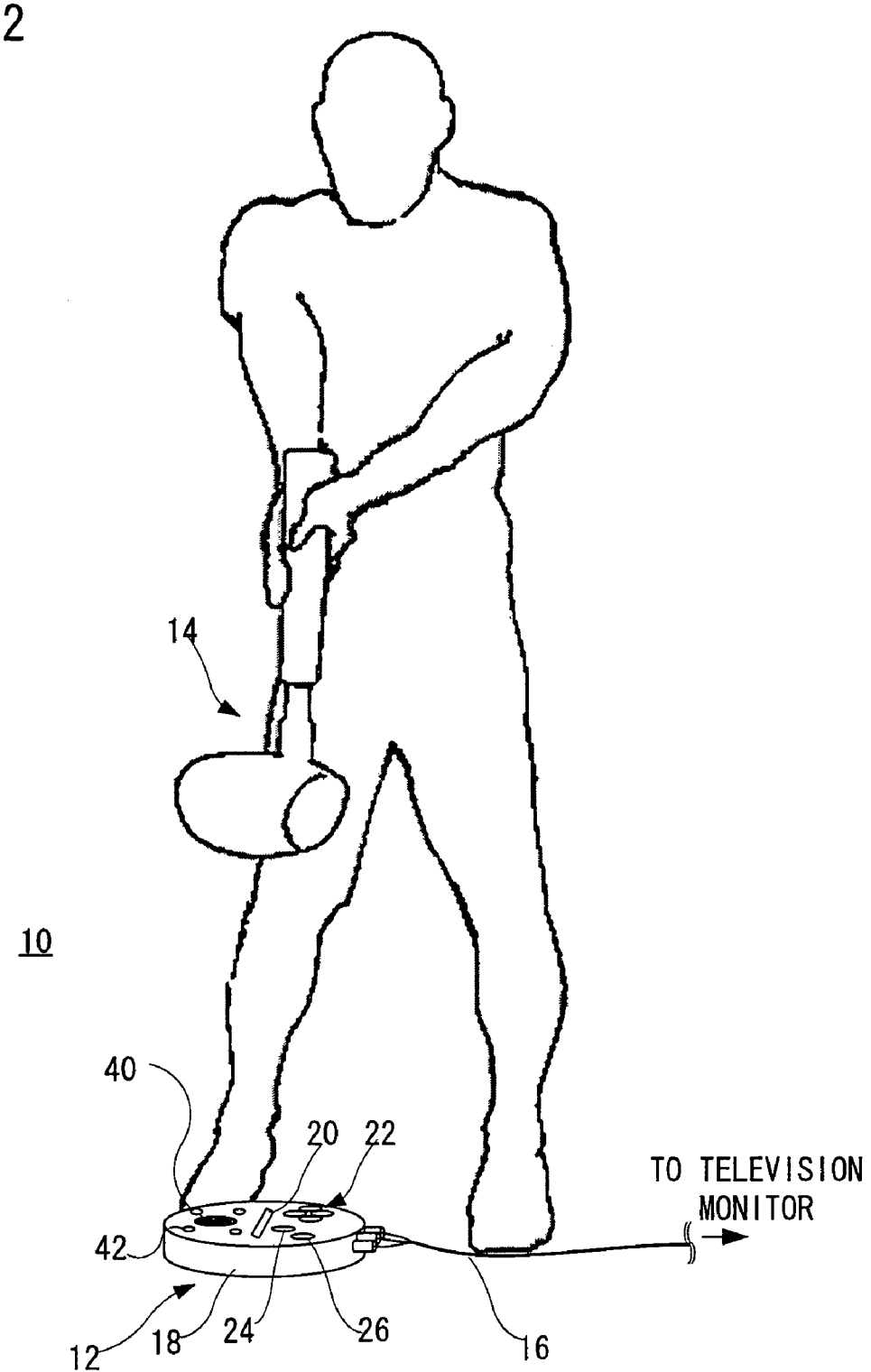
FIG. 2 is an illustrative view showing an entire configuration of a golf game system of one embodiment of the present invention.

With referring to FIG. 2, a golf game system 10 of one embodiment of the present invention includes a game machine 12 and a golf-club-shaped input device 14, and the golf-club-shaped input device 14 is swung by a game player over the game machine 12. It is noted that the game machine 12 is driven by a direct-current power supply such as an AC adapter (not shown) or a battery, for example. The game machine 12 is further connected to an AV terminal (not shown) of a television monitor (not shown) via an AV cable 16.

The game machine 12 includes a housing 18, and on the housing 18, a power switch 20 is provided, and a direction button 22, a determination key 24 and a cancel key 26 are also provided. The direction button 22 has respective buttons of four directions (a up, down, left and right), and utilized for moving a cursor in order to select a menu or a game mode on a display screen of a television monitor, for example. The determination key 24 is utilized for determining an input to the game machine 12. Furthermore, the cancel key 26 is utilized for canceling an input to the game machine 12.

Figure 3:
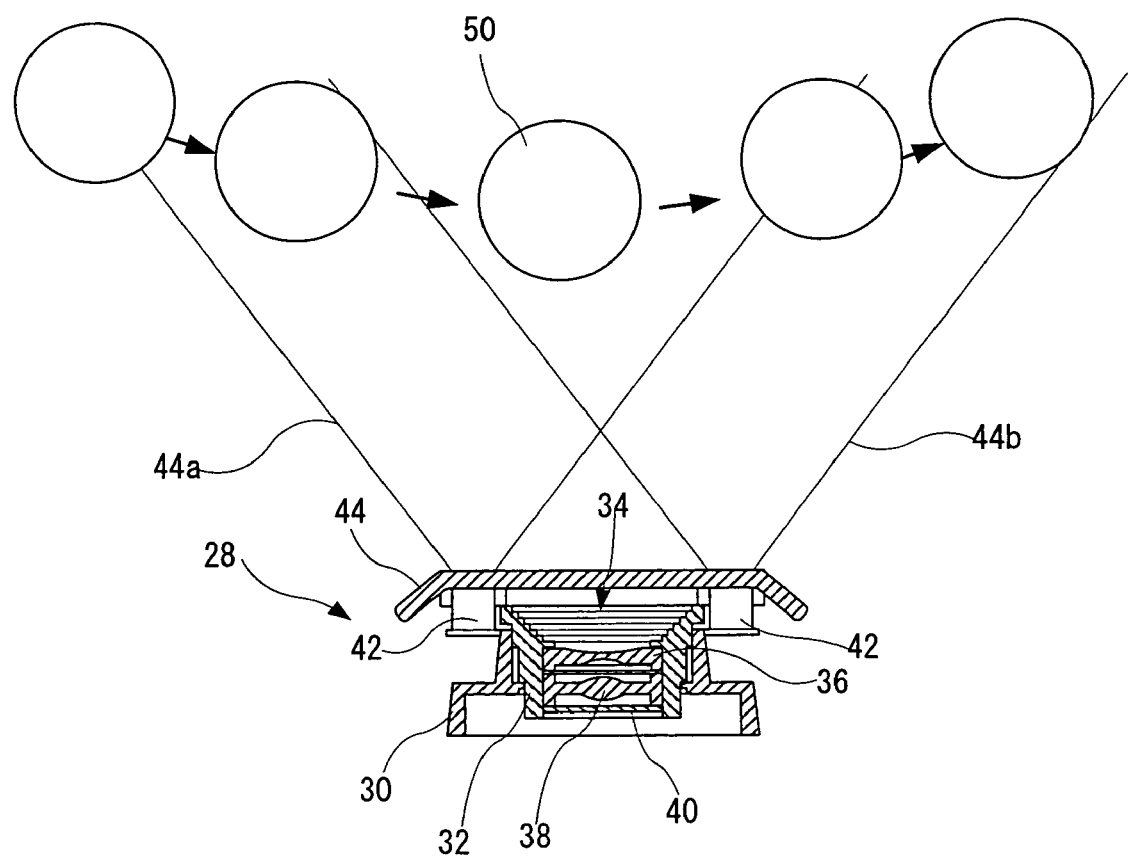
FIG. 3 is an illustrative view showing one example of an imaging unit of FIG. 2 embodiment.

Inside the housing 18 of the game machine 12, an imaging unit 28 shown in FIG. 3 in detail is housed. The imaging unit 28 includes a unit base 30 formed by a plastic molding, for example, and to the unit base 30, a supporting cylinder 32 is attached. On an upper surface of the supporting cylinder 32, an opening 34 whose inside is in a form of inverted-conical shaped bugle is formed, an optical system including a concave lens 36 and a convex lens 38 both formed by a transparent plastic molding, for example, is provided inside a cylindrical portion below the opening 34, and beneath the convex lens 38, an image sensor 40 as an imaging device is fixed. Accordingly, the image sensor 40 can photograph an image corresponding to a light incident from the opening 34 through the lenses 36 and 38.

The image sensor 40 is a CMOS image sensor of low resolution (for example, 32×32 pixels: gray scale). It is noted that the image sensor 40 may have pixels greater in number, or may consist of another device such as CCD, or the like.

Furthermore, the unit base 30 is provided with a plurality of infrared-LEDs (four (4) in this embodiment) each having an upper light emitting direction. By the infrared-LEDs 42, an infrared light is irradiated within a range defined by the lines 44a and 44b above the imaging unit 28 shown in FIG. 3. Furthermore, above the unit base 30, an infrared filter (filter for passing through only the infrared ray) is attached so as to cover the above-described opening 34. Then, the infrared-LED 42 is as described later continuously turned on/off so as to function as an infrared stroboscope. It is noted that the "stroboscope" is a generic name for intermittently irradiating a moving body. Accordingly, the above-described image sensor 40 images a moving body, that is, a reflective body 50 (see FIG. 4) provided on the golf-club-shaped input device 14 in this embodiment, which moves within a imaging range shown by lines 44a and 44b.

Figure 4:
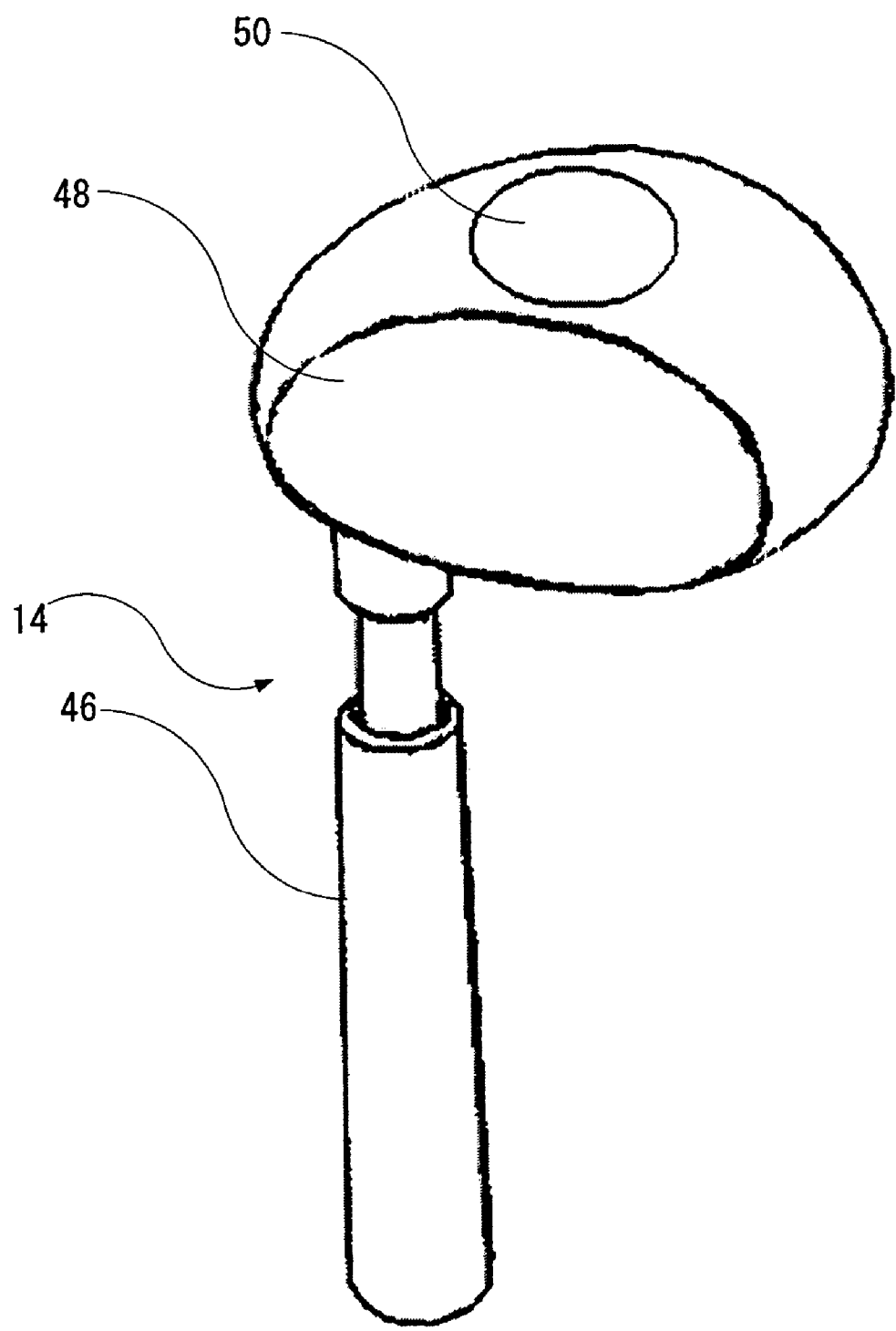
FIG. 4 is an illustrative view showing one example of a golf-club-shaped input device of FIG. 2 embodiment.

The golf-club-shaped input device 14 is entirely formed by a plastic molding, for example, and, as shown in FIG. 4, includes a club shaft 46 and a club head 48 attached at a tip end of it. At the bottom of the club head 48, a circle-shaped reflective body 50 consisting of a retroreflection sheet, for example, is provided. Accordingly, as shown in FIG. 2, when a game player swings with the club shaft 46 as the input device 44 in his hands above the game machine 12 as he generally plays the golf, a light reflected by the reflective body 50 at the bottom surface of the head 48 is imaged by the image sensor 40. At this time, the infrared-LED 42 intermittently irradiates the infrared light as described above, and therefore, the reflective body 50 is intermittently imaged as shown in FIG. 3. In the golf game system 10 of this embodiment, as described later, by such the strobe image processing of the reflective body, a velocity as an input to the game machine 12, etc. is calculated.

Figure 5:
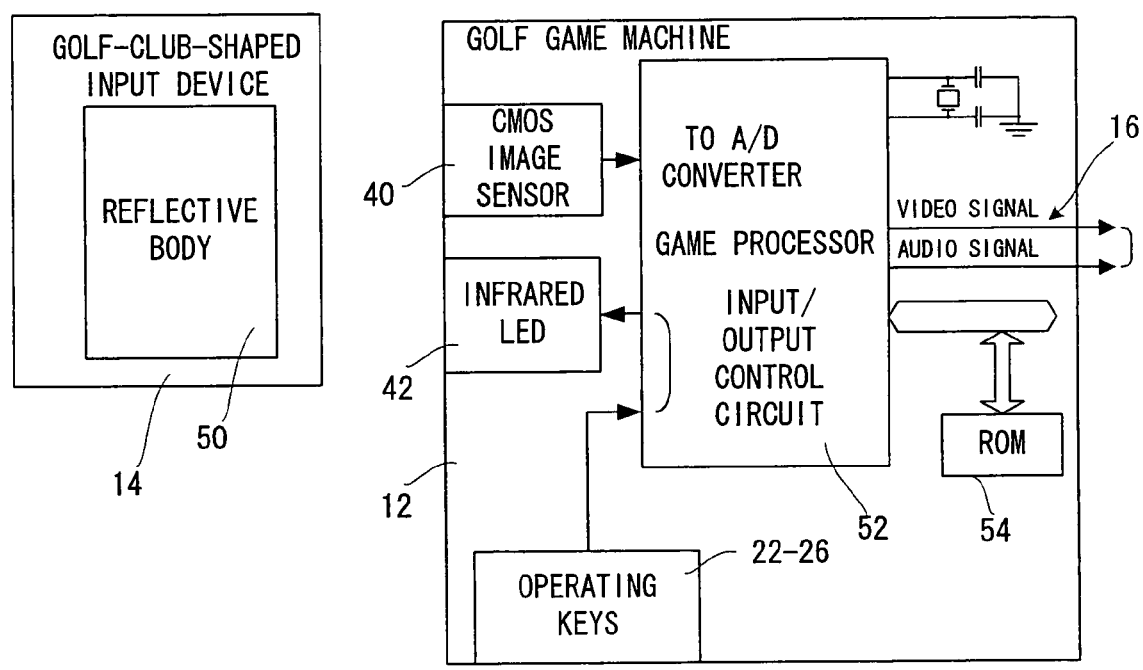
FIG. 5 is a block diagram showing FIG. 2 embodiment.

With referring to FIG. 5, the club-shaped input device 14 is irradiated by a light emission from the infrared-LED 42, and reflects the infrared light by the reflective body 50. The reflected light from the reflective body 50 is imaged by the image sensor 40, and the image sensor 40 outputs an image signal of the reflective body 50. The analog image signal from the image sensor 40 is converted into digital data by an A/D converter (not shown) included in a game processor 52.

It is noted that the game processor 52 intermittently blinks the infrared-LED 42 for the above-described strobe imaging.

Although arbitrary kinds of processor can be utilized as such the game processor 52, a high-speed processor developed by the applicant of the present invention and already filed as a patent application is used in this embodiment. This high-speed processor is disclosed in detail in Japanese Patent Laying-open No. H10-307790 [G06F13/36, 15/78] and U.S. Pat. No. 6,070,205 corresponding thereto.

Although not illustrated, the game processor 52 includes various processors such as a CPU, a graphics processor, a sound processor, a DMA processor, etc. and also includes the above-described A/D converter used for fetching an analog signal, and an input/output control circuit for receiving an input signal such as a key operation signal and an infrared signal, and giving an output signal to external equipment. Therefore, an input signal from the operation keys 22-26 is applied to the CPU through the input/output control circuit. The CPU executes a required operation according to the input signal, and applies the result to the graphics processor, the sound processor, etc. Therefore, the graphic processor and the sound processor execute an image processing and a sound processing according to the operation result.

Although not illustrated, the processor 52 is provided with an internal memory, and the internal memory includes a ROM or a RAM (SRAM and/or DRAM). The RAM is utilized as a temporary memory, a working memory, a counter, or a register area (temporary data area), and a flag area. It is noted that the processor 52 is connected with a ROM 54 via an external bus. In the ROM 54, a game program described later is set in advance.

The processor 52 processes a digital image signal input from the image sensor 40 via the A/D converter to detect a movement of the golf-club-shaped input device 14, and executes an arithmetic operation, a graphic processing, a sound processing, etc. to output a video signal and an audio signal. The video signal is an image signal for displaying a game screen, and the audio signal is a signal for a game music and a sound effect. Accordingly, a game screen is displayed on the screen of a television monitor (not shown), and a necessary sound (sound effect, game music) is output from its speaker.

Figure 6:
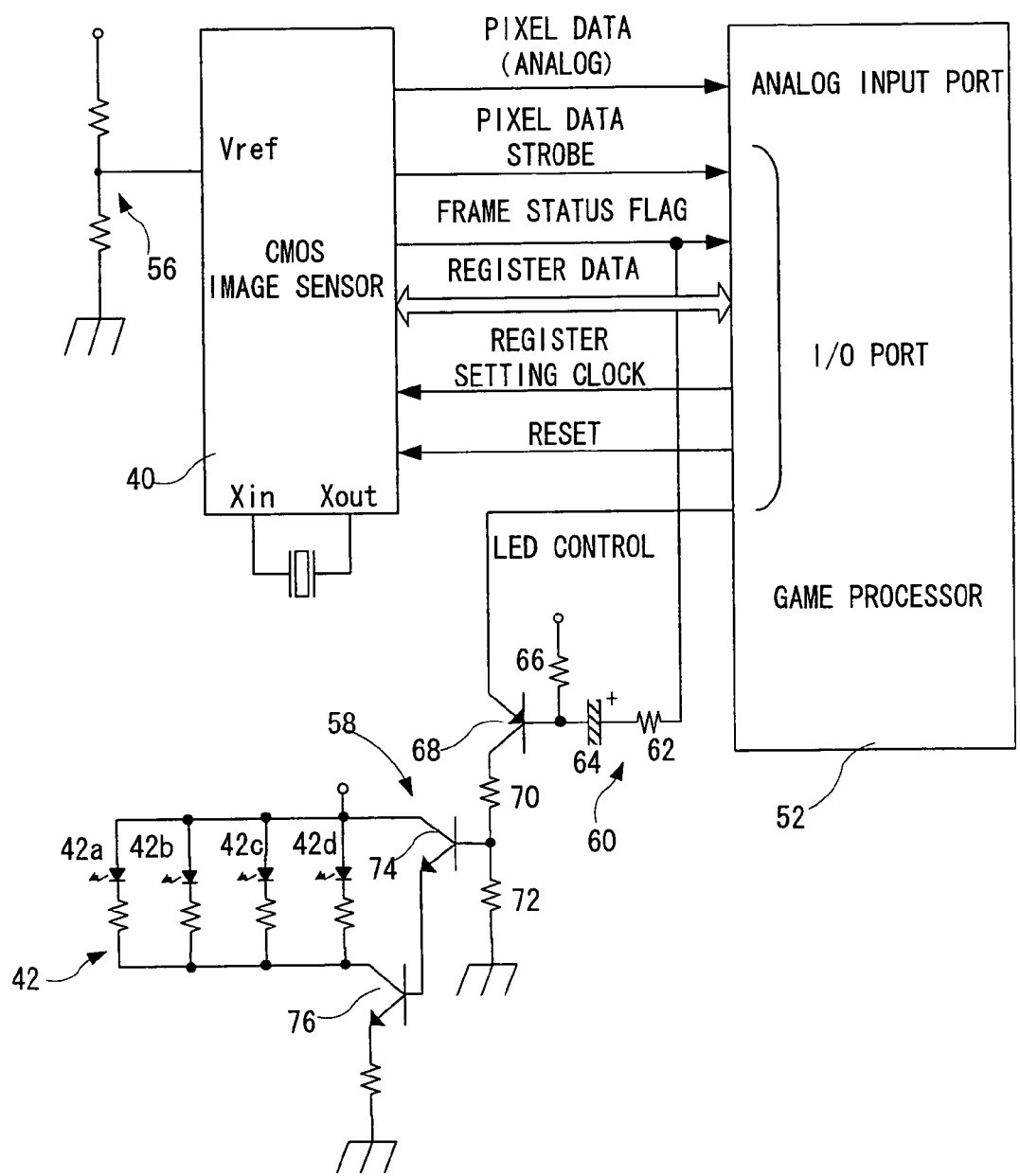
FIG. 6 is a schematic circuit diagram showing a configuration of fetching pixel data into a game processor from an image sensor and an LED driving circuit in FIG. 5 embodiment.
Figure 7:
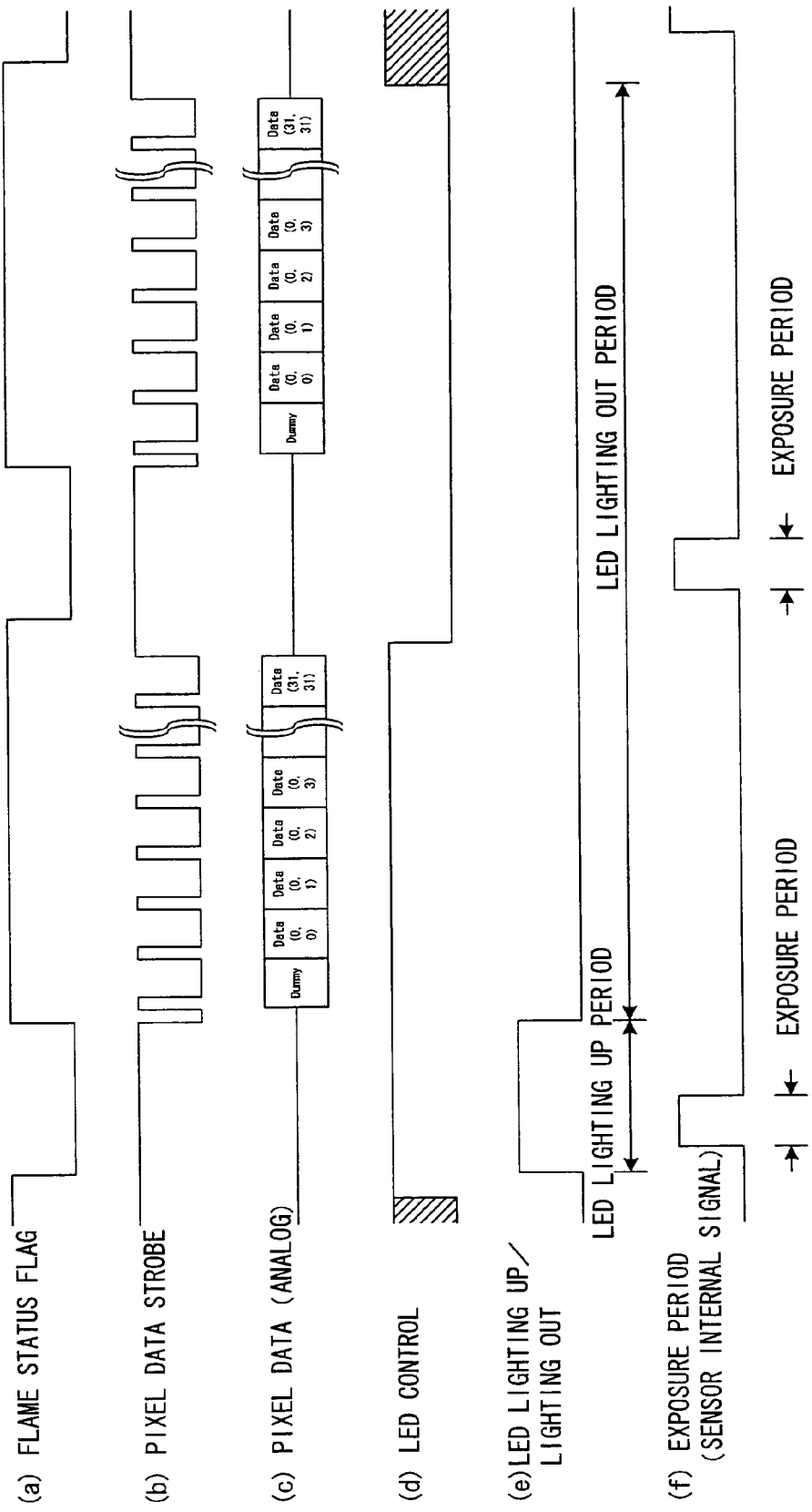
FIG. 7 is a timing chart showing an operation of FIG. 6 embodiment.
Figure 8:
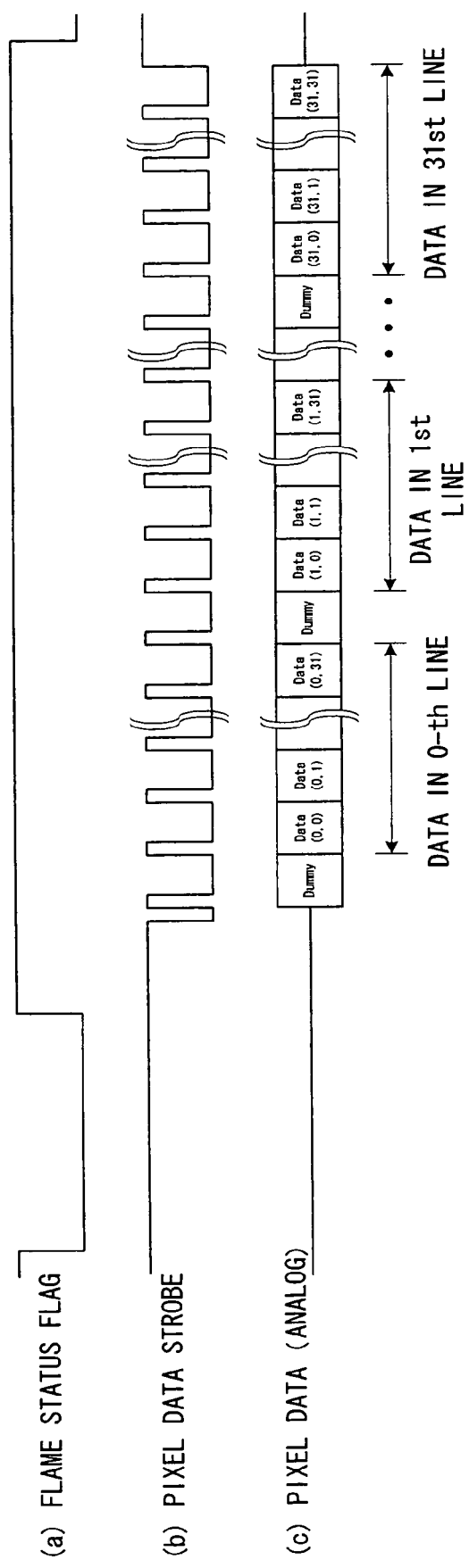
FIG. 8 is a timing chart showing a part of FIG. 7 in an enlarged manner.

Here, with referring to FIG. 6 to FIG. 8, a configuration for fetching pixel data to the game processor 52 from the COMS image sensor 40 is described in detail. As shown in FIG. 6, the CMOS image sensor 40 in this embodiment is a type of outputting a pixel signal as an analog signal, and therefore, the pixel signal is input to an analog input port of the game processor 52. The analog input port is connected to an A/D converter (not shown) within the game processor 52, and thus, the game processor 52 obtains or fetches from the A/D converter the pixel signal (pixel data) that has been converted to digital data.

A midpoint of the above-described analog pixel signal is determined by a reference voltage applied to a reference voltage terminal Vref of the CMOS image sensor 40. Therefore, in this embodiment, as to the image sensor 40, a reference voltage generating circuit 56 including a resistor voltage-dividing circuit, for example, is provided, and from the reference voltage generating circuit 56, a reference voltage having a constant magnitude is always applied to the reference voltage terminal Vref.

Each of digital signals for controlling the CMOS image sensor 40 is applied to the I/O port of the game processor 52, or output therefrom. The I/O ports are digital ports capable of controlling respective input/outputs, and connected to an input/output control circuit (not shown) within the game processor 52.

More specifically, from the output port of the game processor 52, a reset signal for resetting the image sensor 40 is output so as to be applied to the image sensor 40. Furthermore, from the image sensor 40, a pixel data strobe signal and a frame status flag signal are output, and these signals are applied to the input port of the game processor 52. The pixel data strobe signal is a strobe signal as shown in FIG. 7(b) for reading each of the pixel signals described above. The frame status flag signal is a flag signal for showing a state of the image sensor 40, and defines an exposure period of the image sensor 40 as shown in FIG. 7(a). A low level of the frame status signal shown in FIG. 7(a) indicates an exposure period, and a high level thereof shown in FIG. 7(a) indicates a non-exposure period.

Furthermore, the game processor 52 outputs from the I/O port a command (or command+data) set in a control register (not shown) within the CMOS image sensor 40 as register data, and outputs a register setting clock in which the high level and the low level are repeated and applies it to the image sensor 40.

It is noted that as the infrared-LED 42, four (4) infrared-LEDs 42a, 42b, 42c, and 42d connected in parallel with each other are utilized as shown in FIG. 6. These four (4) infrared-LEDs 42a-42d are arranged such that they irradiate the object (golf-club-shaped input device 14) as described above, emits an infrared light in a direction the same as viewpoint direction of the image sensor 40, and surrounds the image sensor 40. It is noted that these respective infrared-LEDs 42a-42d are simply called as the infrared-LED 42 except as especially required by discrimination. The infrared-LED 42 is turned on and is extinguished (turned off) by the LED driving circuit 58. The LED driving circuit 58 receives the above-described frame status flag signal from the image sensor 40, and the flag signal is applied to a base of a PNP transistor 68 through a differentiation circuit 60 consisting of a resistor 62 and a capacitor 64. The PNP transistor 68 is connected with a pull-up resistor 66, and the base of the PNP transistor 68 is normally pulled up to a high level. Then, when the frame status signal becomes a low level, the low level is input to the base through the differentiation circuit 60, and the PNP transistor 68 is turned on only during a low level period of the flag signal.

A collector of the PNP transistor 68 is grounded via resistors 70 and 72. Then, a node of collector resistances 70 and 72 is connected to the base of an NPN transistor 74. A collector of the NPN transistor 74 is commonly connected to anodes of the respective infrared-LEDs 42a-42d. An emitter of the NPN transistor 74 is directly connected to a base of another NPN transistor 76. A collector of the NPN transistor 74 is commonly connected to cathodes of the respective infrared-LEDs 42a-42d, and the emitter thereof is grounded.

In the LED driving circuit 58, the infrared-LED 42 is turned on during only a period when the LED control signal (corresponding to a second signal) output from the I/O port of the game processor 52 is active (high level), and the frame status flag signal from the image sensor 40 is a low level. As shown in FIG. 7(a), when the frame status flag signal becomes the low level, the PNP transistor 68 is turned on during the low level period (although there is a delay due to the time constant of the differentiation circuit 60 in reality). Accordingly, when the LED control signal shown in FIG. 7(d) is output from the game processor 52 at the high level, the base of the NPN transistor 74 becomes a low level, and then, the transistor 68 is turned off. When the transistor 68 is turned off, the transistor 74 is turned on. Accordingly, a current flows a power supply (shown by a small white circle in FIG. 6) through the respective infrared-LEDs 42a-42d and the transistor 76, and in response thereto, the respective infrared-LEDs 42a-42d are turned on as shown in FIG. 7(e).

In the LED driving circuit 58 of this embodiment, the infrared-LED 42 is turned on only when the LED control signal shown in FIG. 7(d) is active, and the frame status flag signal is low level, and therefore, the infrared-LED 42 is turned on only during an exposure period (see FIG. 7(f)) of the image sensor 40. Therefore, according to this embodiment, it is possible to reduce useless power consumption. Furthermore, the frame status flag signal is coupled by the capacitor 64, and therefore, on assumption that the flag signal is suspended with the low level kept due to a hang-up of the image sensor 40 and the like, the transistor 68 is surely turned off after a lapse of a predetermined time period, and the infrared-LED 42 is surely turned off after a lapse of the predetermined time period.

Thus, it is possible to change the exposure time period of the image sensor 40 arbitrarily and freely by changing duration of the frame status signal.

In addition, by changing the duration or period of the frame status signal and the LED control signal, it is possible to arbitrarily and freely set a light-emission period, a non light-emission period, a duty cycle of light-emission/non light-emission, etc. of the infrared-LED 42, that is, the stroboscope.

As described previously, when the reflective body 50 of the golf-club-shaped input device 14 is irradiated by an infrared light from the infrared-LED 42, the image sensor 40 is exposed by the reflected light from the reflective body 50. In response thereto, the pixel signal described above is output from the image sensor 40. More specifically, the CMOS image sensor 40 outputs an analog pixel signal shown in FIG. 7(c) in synchronous with a pixel data strobe shown in FIG. 7(b) during a period when the frame status signal shown in the above-described FIG. 7(a) is the high level (a period when the infrared-LED 42 is not turned on). The game processor 52, while monitoring the frame status flag signal and the pixel data strobe, obtains a digital pixel data through the A/D converter.

It is noted that the pixel data (pixel signal) is output in an order of lines such as the zero line, the first line, . . . to the thirty-first line as shown in FIG. 8(c). It is noted that single pixel data at the head of each of lines becomes dummy data.

Figure 9:
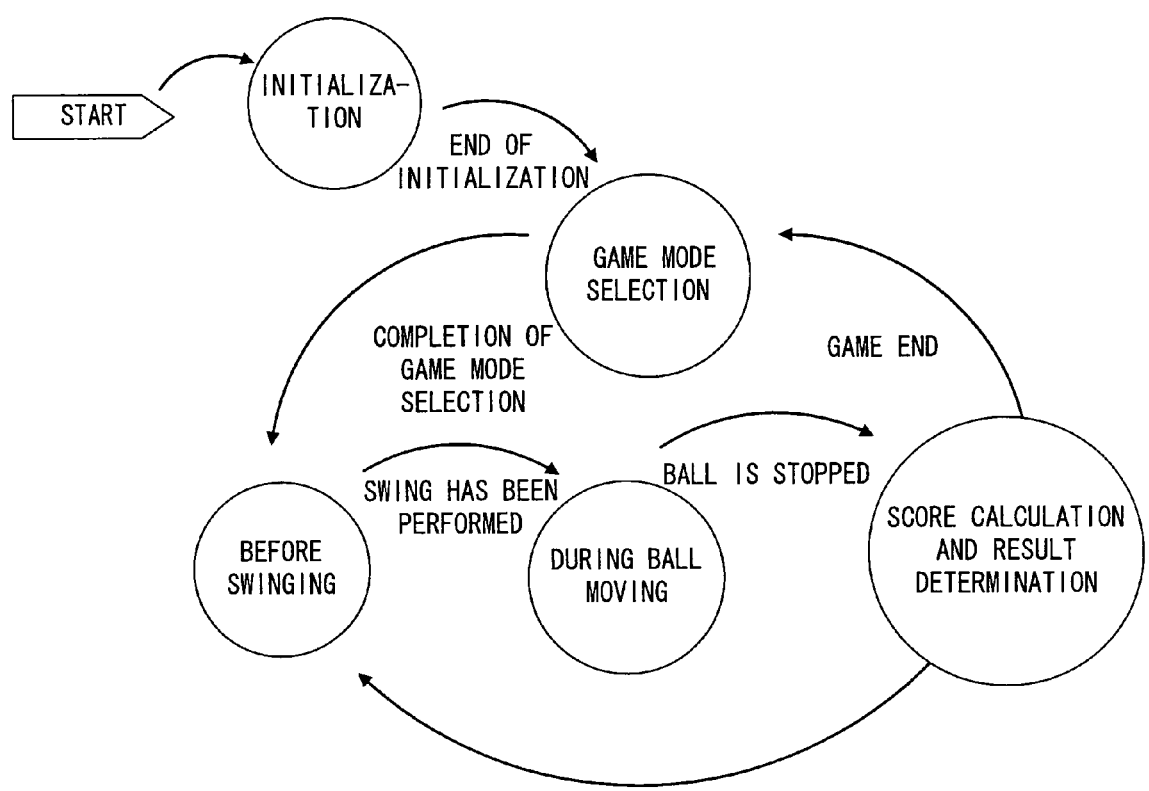
FIG. 9 is an illustrative view showing a state or state transition of FIG. 2 embodiment.
Figure 10:
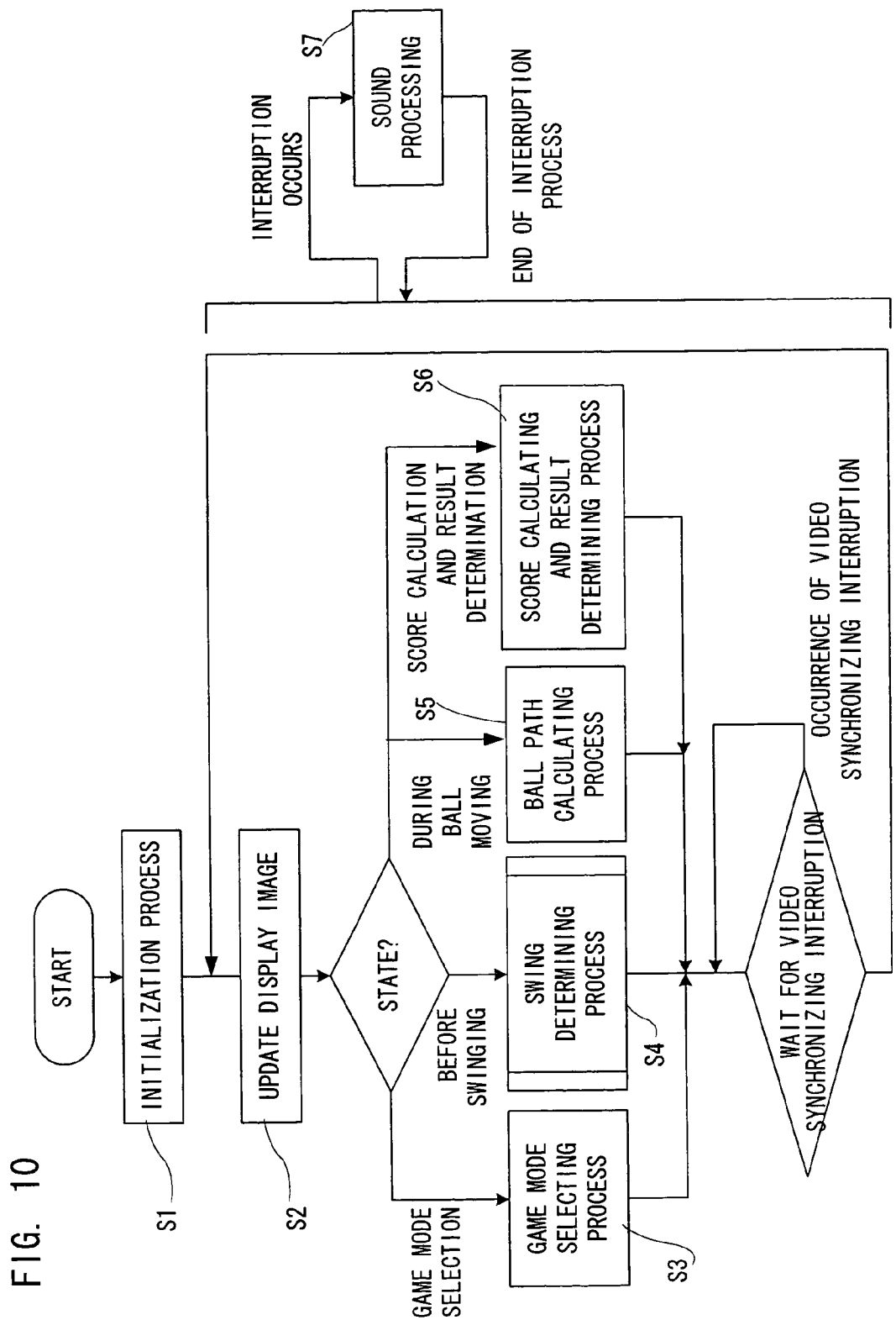
FIG. 10 is a flowchart showing an entire operation of FIG. 2 embodiment.

Here, with referring to FIG. 9 and FIG. 10, a brief operation of the golf game system 10 of FIG. 2 embodiment is described. A game is started by turning the power switch 20 shown in FIG. 2 on. It is noted that the game processor 52 shown in FIG. 5 executes an initialization process in a step S1. More specifically, the system and the respective variables are initialized.

Figure 11:
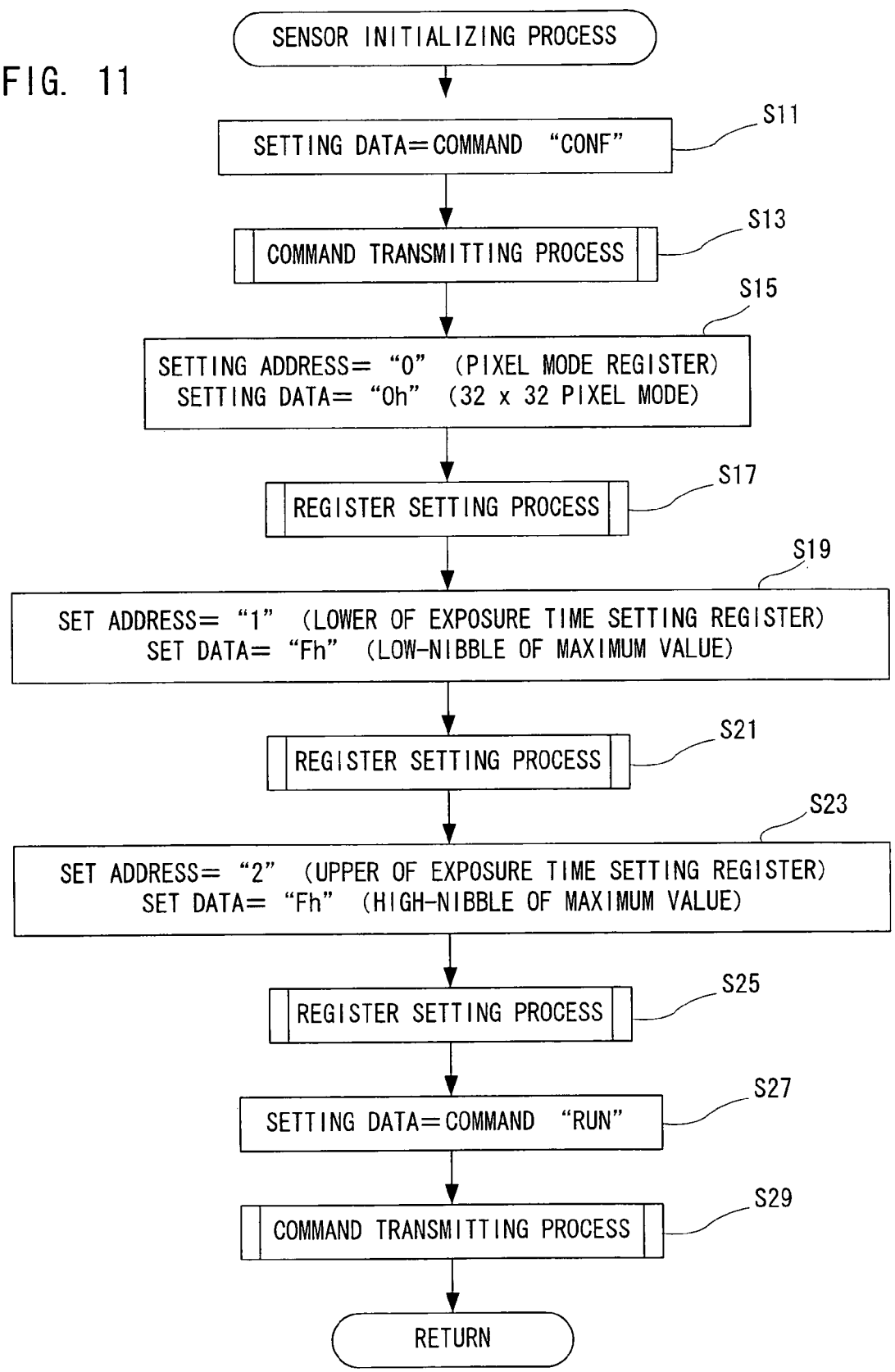
FIG. 11 is a flowchart showing a sensor initializing process being one example of an initialization process of FIG. 10 embodiment.
Figure 12:
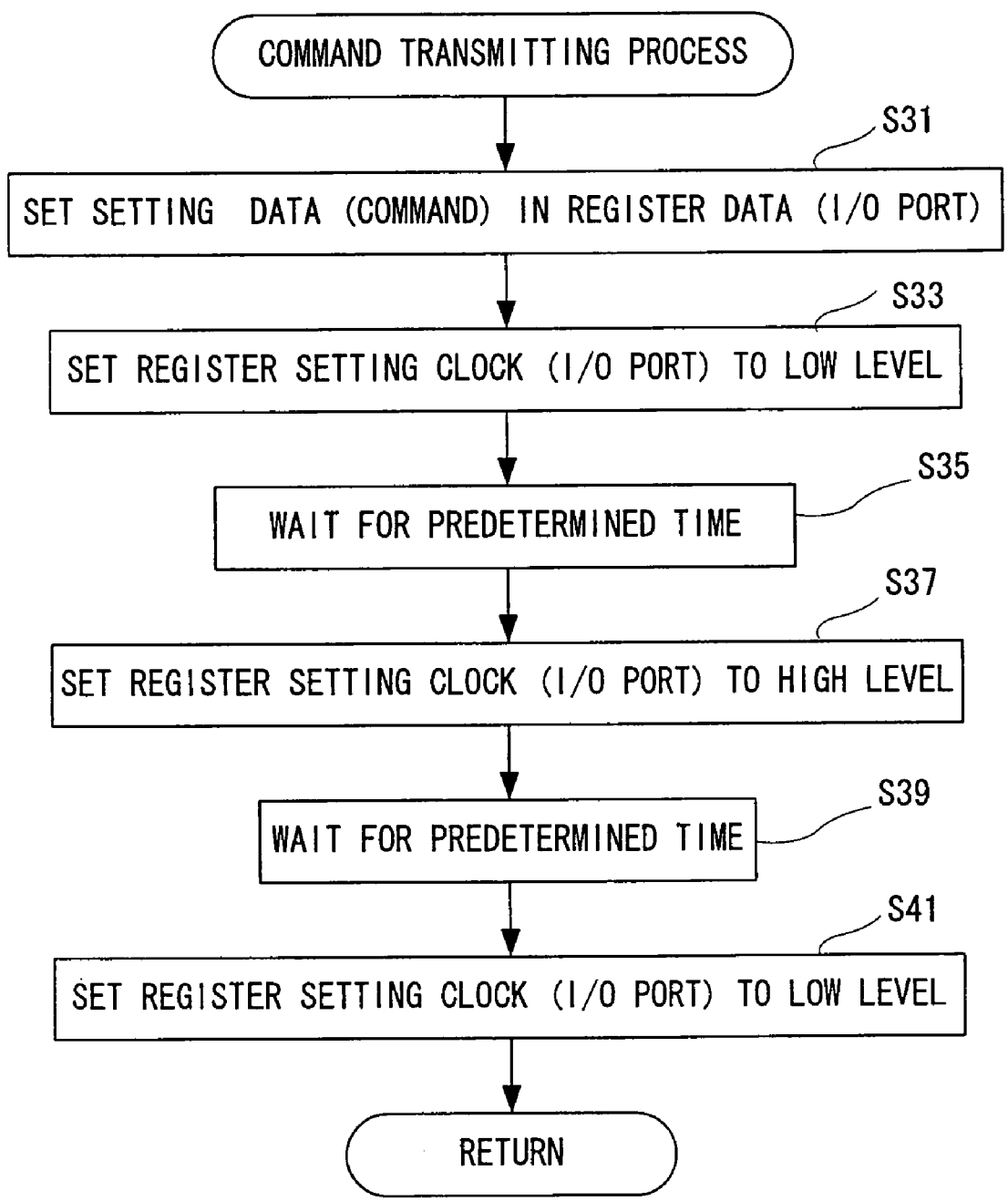
FIG. 12 is a flowchart showing a command transmitting process in FIG. 11.
Figure 13:
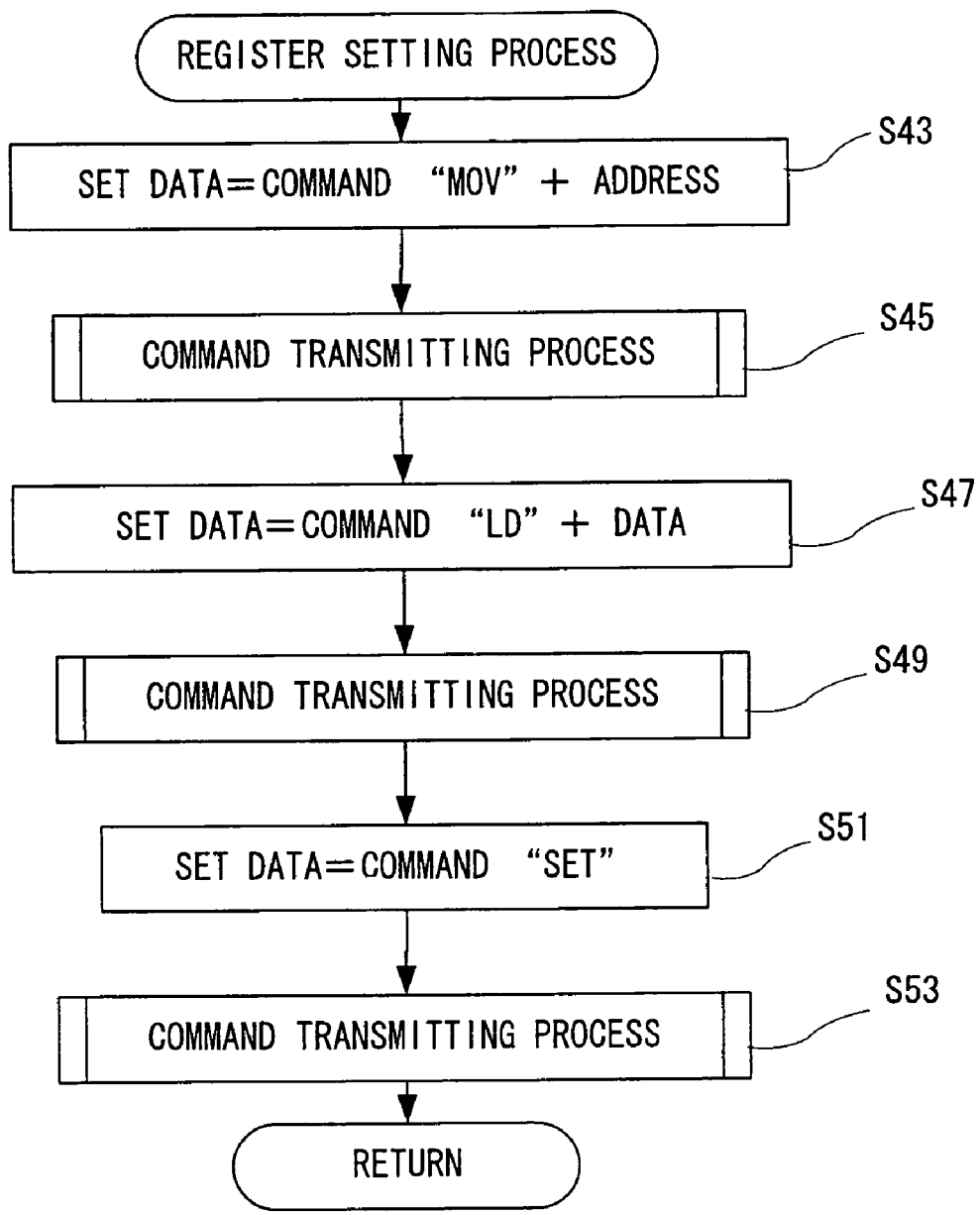
FIG. 13 is a flowchart showing a register setting process in FIG. 11.
Figure 14:
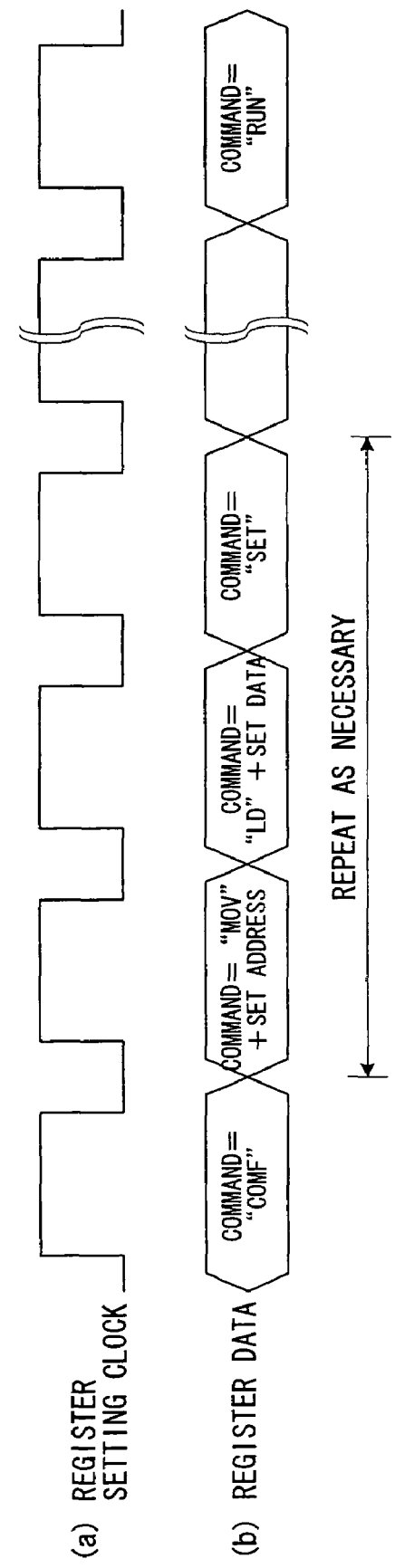
FIG. 14 is a timing chart showing the register setting process shown in FIG. 13.

The initialization process in the step S1 includes a data setting processing with respect to the control register contained in the image sensor 40, and is specifically executed according to the flowchart shown in FIG. 11 to FIG. 13 and at timing shown in FIG. 14.

In a first step S11 shown in FIG. 11, the game processor 52 sets a command "CONF" as setting data. It is noted that the command "CONF" is a command for informing the image sensor 40 of entering the setting mode for transmitting a command from the game processor 52. Then, in a following step S13, a command transmitting process is executed shown in detail in FIG. 12.

In a first step S31 of the command transmitting process, the processor 52 sets the setting data (command "CONF" for the step S13) to the register data (I/O port), and sets a register setting clock (I/O port) to a low level in a next step S33. Then, after a wait of a predetermined time period in a step S35, the register setting clock is set to a high level in a step S37. Then, after a wait of a predetermined time period in a step S39, the register setting clock is set to the low level once again in a step S41. Thus, as shown in FIG. 14, by performing the wait of the predetermined time period, the register setting clock is changed to the low level, the high level, and the low level one after another, and whereby, a transmitting process of the command (command or command+data) is performed.

In a step S15 (FIG. 11), a pixel mode is set, and an exposure time period is set. In the case of this embodiment, the image sensor 40 is, as described above, a CMOS sensor of 32×32, for example, and therefore, "0h" indicative of being 32×32 pixels is set to the pixel mode register of the setting address "0". In a next step S17, the game processor 52 executes a register setting process shown in FIG. 13 in detail.

In a first step S43 of the register setting process, the processor 52 sets a command "MOV"+address as a setting data, and, in a following step S45, executes a command transmitting process described above in FIG. 12 to transmit it. The processor 52 sets the command "LD"+data as the setting data in a succeeding step S47, and executes a command transmitting process to transmit it in a following step S49. The processor 52 sets a command "SET" as the setting data in a step S51 to transmit it in a following step S53. It is noted that the command "MOV" is a command indicative of transmitting an address of the control register, the command "LD" is a command indicative of transmitting data, and the command "SET" is a command for actually setting data to its address. It is noted that the process is repeated in a case that there are a plurality of control registers to be set.

Returning to FIG. 11, in a next step S19, the setting address is rendered "1" (indicative of low-Nibble address of an exposure time setting register), and low-Nibble data "Fh" of "FFh" indicative of a maximum exposure time period is set as data to be set. Then, in a step S21, the register setting process in FIG. 13 is executed. Similarly, in a step S23, the setting address is rendered "2" (indicative of high-Nibble address of an exposure time setting register), and high-Nibble data "Fh" of "FFh" indicative of the maximum exposure time period is set as data to be set, and the register setting process is executed in a step S25. Then, in a step S27, a command "RUN" indicative of an end of the setting and for starting to output data from the image sensor 40 is set so as to be transmitted in a step S29.

Thus, the initialization process is executed in the step S1 shown in FIG. 10. It is noted that the embodiment shown in FIG. 11 to FIG. 14 can be changed according to a specification of the image sensor to be used.

After the step S1 in FIG. 10, the game processor 52 updates an image signal so as to update an image to be displayed on a monitor (not shown) in a step S2. It is noted that the update of the display image is executed for each frame (television frame or video frame).

Figure 1:
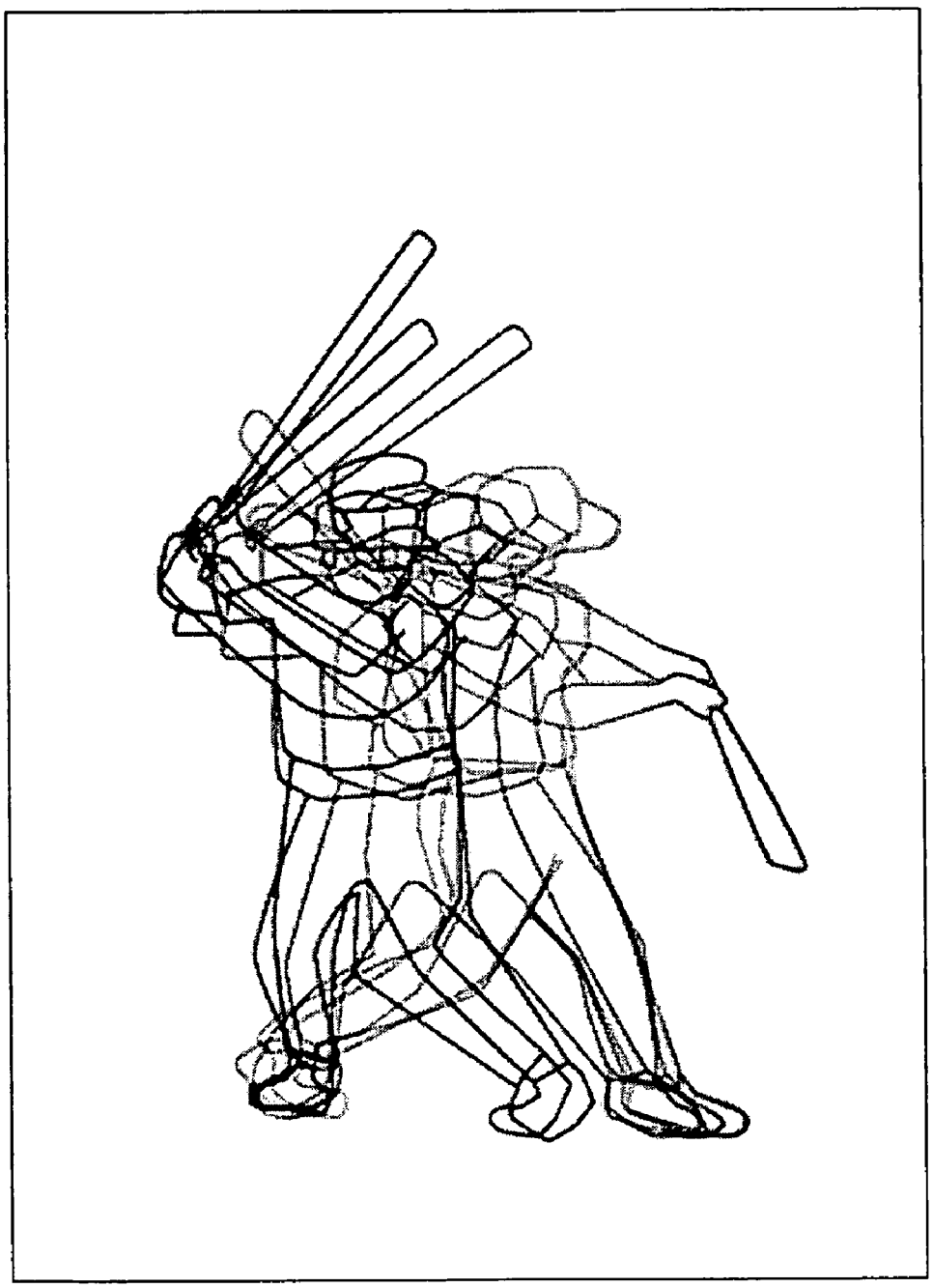
FIG. 1 is an illustrative view showing one example of a strobe image imaged by a stroboscope.

Then, the game processor 52 executes a process according to a state. It is noted that it is a selection of the game mode that has to be processed first. In the game mode selection, a user or a game player selects a game mode such as one-player mode or a two-player mode by operating the selection key 22 shown in FIG. 1, and sets a difficulty level of the game, and so on.

In an actual golf game, it is necessary to roll a ball by swinging a golf club, and in the golf game system 10 in this embodiment, a swinging action of the golf club is performed in a real space by use of the golf-club-shaped input device 14. Here, the game processor 52 executes a swing determining process of the swing action to determine whether or not the swing action is performed in a step S4. Then, when the swing action is performed, the ball is flied or rolled in the game screen, and a ball path is calculated in a step S5. When the ball is stopped, a score calculating and result determining process is executed in a step S6 as a result of the ball path calculating process in the step S5.

Then, if an interruption occurs in response to a video synchronizing signal, an image updating in the step S2 (FIG. 10) is executed. Furthermore, the sound processing in a step S7 is executed at a time of occurrence of a sound interruption, and whereby, a game music and a sound effect such as hitting a ball, and so on are output.

With referring to FIG. 15 to FIG. 22, a specific entire operation of such the golf game system 10 is described. In a first step S55 in FIG. 15, the game processor 52 executes a stroboscope imaging process for detecting a moving position of the golf-club-shaped input device 14.

Figure 16:
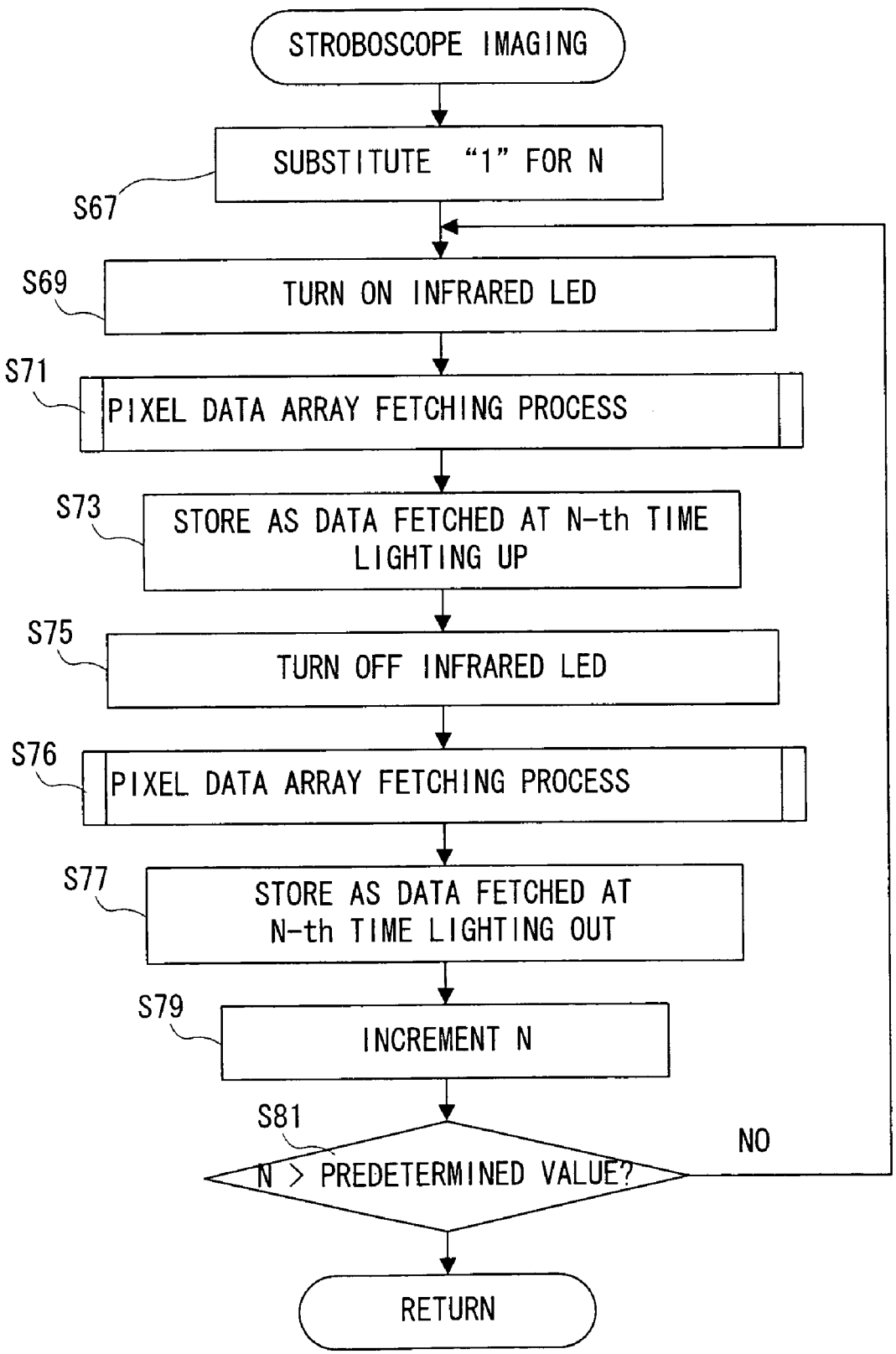
FIG. 16 is a flowchart showing a stroboscope imaging process in FIG. 15 embodiment.

A detail of the stroboscope imaging process is shown in FIG. 16. In a first step S67 in FIG. 16, the game processor 52 substitutes "1" for the number of times N in the number of times register (not shown) at an arbitrary area of the internal memory (not shown). In a succeeding step S69, the game processor 52 turns the infrared-LED 42 on for the stroboscope imaging. More specifically, the LED control signal shown in FIG. 7 is rendered the high level. Then, in a step S71, a pixel data array fetching process is executed.

Figure 36:
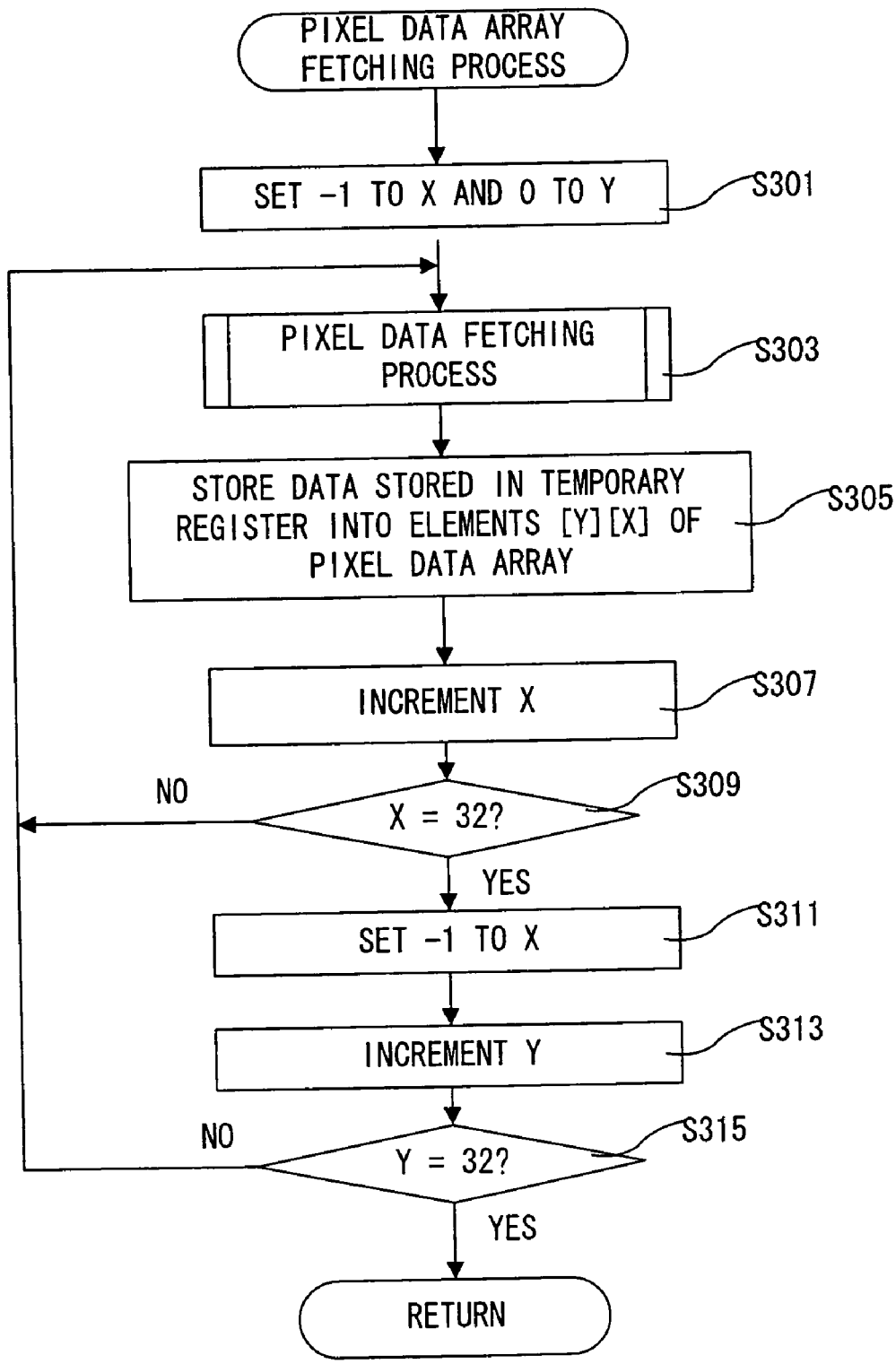
FIG. 36 is a flowchart showing the pixel data array fetching process in FIG. 15 embodiment.

In a first step S301 in FIG. 36, the game processor 52 sets "−1" to X and sets "0" to Y as an element number of the image data array. The pixel data array in this embodiment is two-dimensional array of X=0–31, and Y=0–31. However, the dummy data is output as data of a head pixel in each line as described above, so that "−1" is set as an initial value of X. In a succeeding step S303, a pixel data fetching process of the elements [Y] and [X] shown in FIG. 17 is executed.

Figure 17:
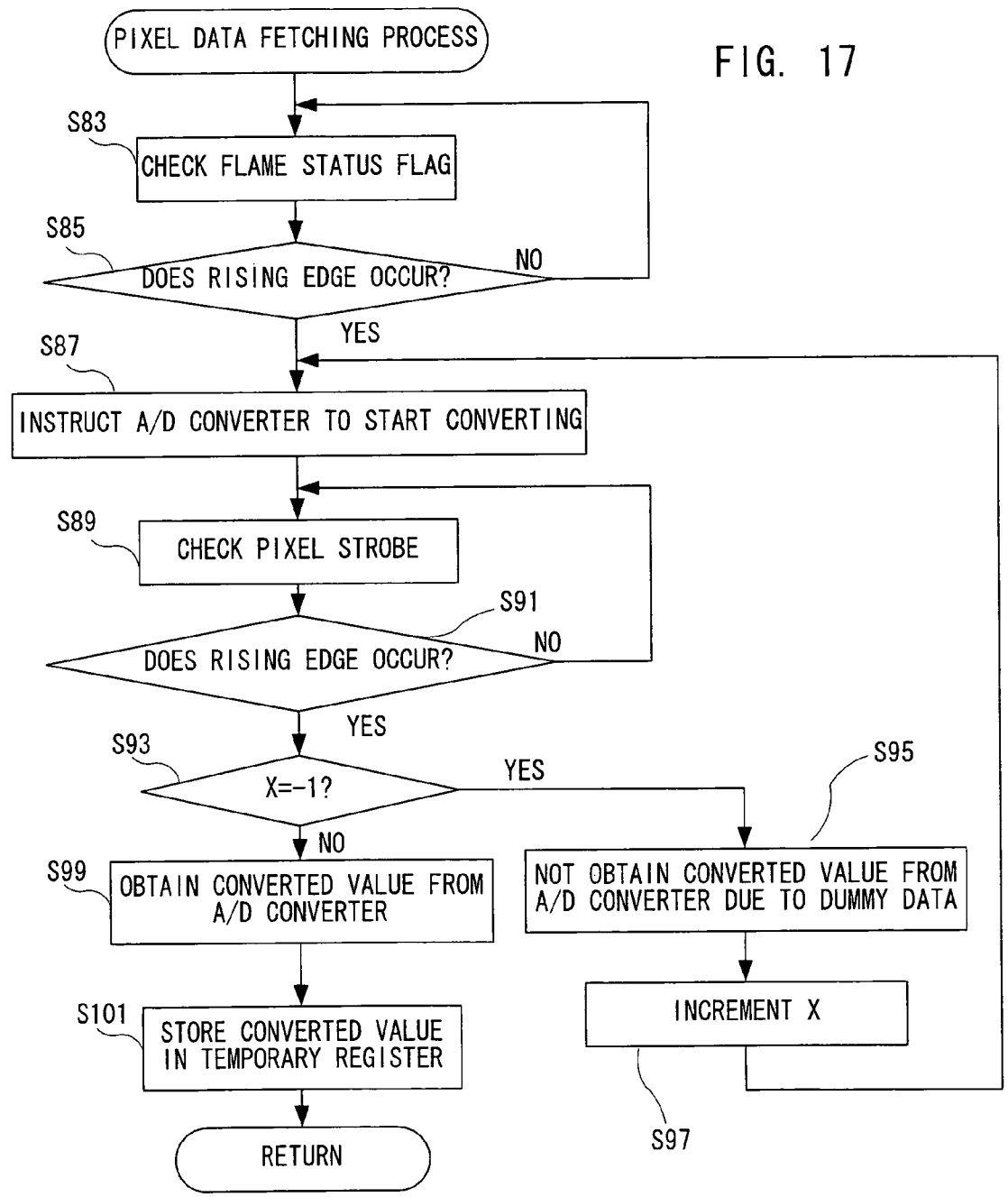
FIG. 17 is a flowchart showing a pixel data fetching process in FIG. 15 embodiment.

In a first step S83 shown in FIG. 17, the game processor 52 checks a frame status flag signal from the image sensor 40, and in a step S85, it is determined whether or not its rising edge (from the low level to the high level) occurs. Then, when it is detected that the flag signal rises in the step S85, the game processor 52 instructs the A/D converter inside thereof to start to convert an input analog pixel signal to digital data in a succeeding step S87. Then, in a step S89, it is determined whether or not the pixel strobe from the image sensor 40 is present, and in a step S91, it is determined whether or not its rising edge from the low level to the high level occurs.

If "YES" is determined in the step S91, the game processor 52 then determines whether X=−1 or not, that is, whether the head pixel or not in a step S93. As described above, the head pixel in each line is set as a dummy pixel, so that if "YES" is determined in the step S93, without fetching the pixel data at that time in a next step S95, the element number X is incremented in a step S97.

If "NO" is determined in the step S93, the second pixel data onward in the line is determined, and therefore, the pixel data at that time is fetched in steps S99 and S101 so as to be stored in a temporary register (not shown). Thereafter, the process returns to a step S305 shown in FIG. 36.

In the step S305, the pixel data stored in the temporary register is stored as the elements [Y] [X] of the pixel data array.

In a following step S309, the X is incremented. If the X is less than 32, the process from the step S303 to the step S307 described above is repeatedly executed. If the X is equal to 32, that is, the fetch of the pixel data is reached to the end of the line, "−1" is set to the X in a following step S311 and the Y" is incremented in a step S313 to repeat the pixel data fetching process from the head pixel of the next line.

If the Y is 32 in a step S315, that is, if the fetch of the pixel data is reached to the end of the pixel data array, the process is returned to a step S73 in FIG. 16.

In the step S73, the above-described pixel data array is stored as fetched data at N-th time lighting in the working area of the internal RAM, for example.

In a following step S75, the game processor 52 turns the infrared-LED 42 off by rendering the LED control signal the low level, and so forth. Thereafter, in a step S76, the pixel data array when the infrared-LED 42 is turned off is obtained according to a subroutine shown in FIG. 17 and FIG. 35 so as to be stored in the working area of the internal RAM in a step S77 similarly to the step S73.

Then, the number of times register N is incremented in a step S79, and it is determined whether or not the number of times N reaches a predetermined value in a step S81. If "YES" in the step S81, the process returns to a step S57 (notable point extracting process). It is noted that if "NO", the process is returned to a preceding step S69.

Figure 18:
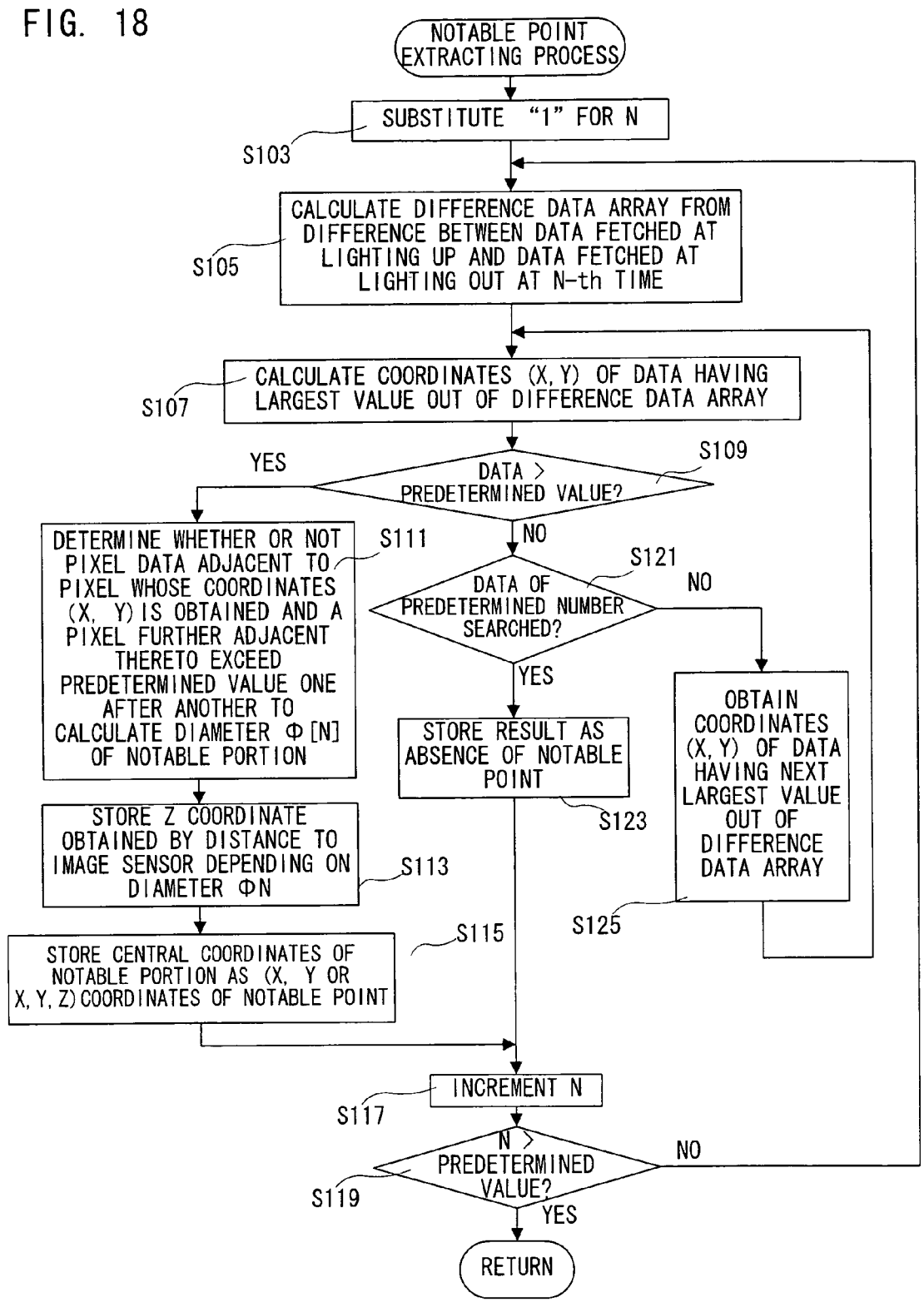
FIG. 18 is a flowchart showing a notable point extracting process in FIG. 15 embodiment.

A detail of the notable point extracting process is shown in FIG. 18. In a first step S103 in FIG. 18, the game processor 52 substitutes "1" for the number of times N of the number of times register (not shown) in the internal memory (not shown). Then, in a following step S105, a difference data array is calculated from differences between the fetched data at lighting up and the fetched data at lighting out that are fetched in the step S73 and the step S77, respectively.

Figure 19:
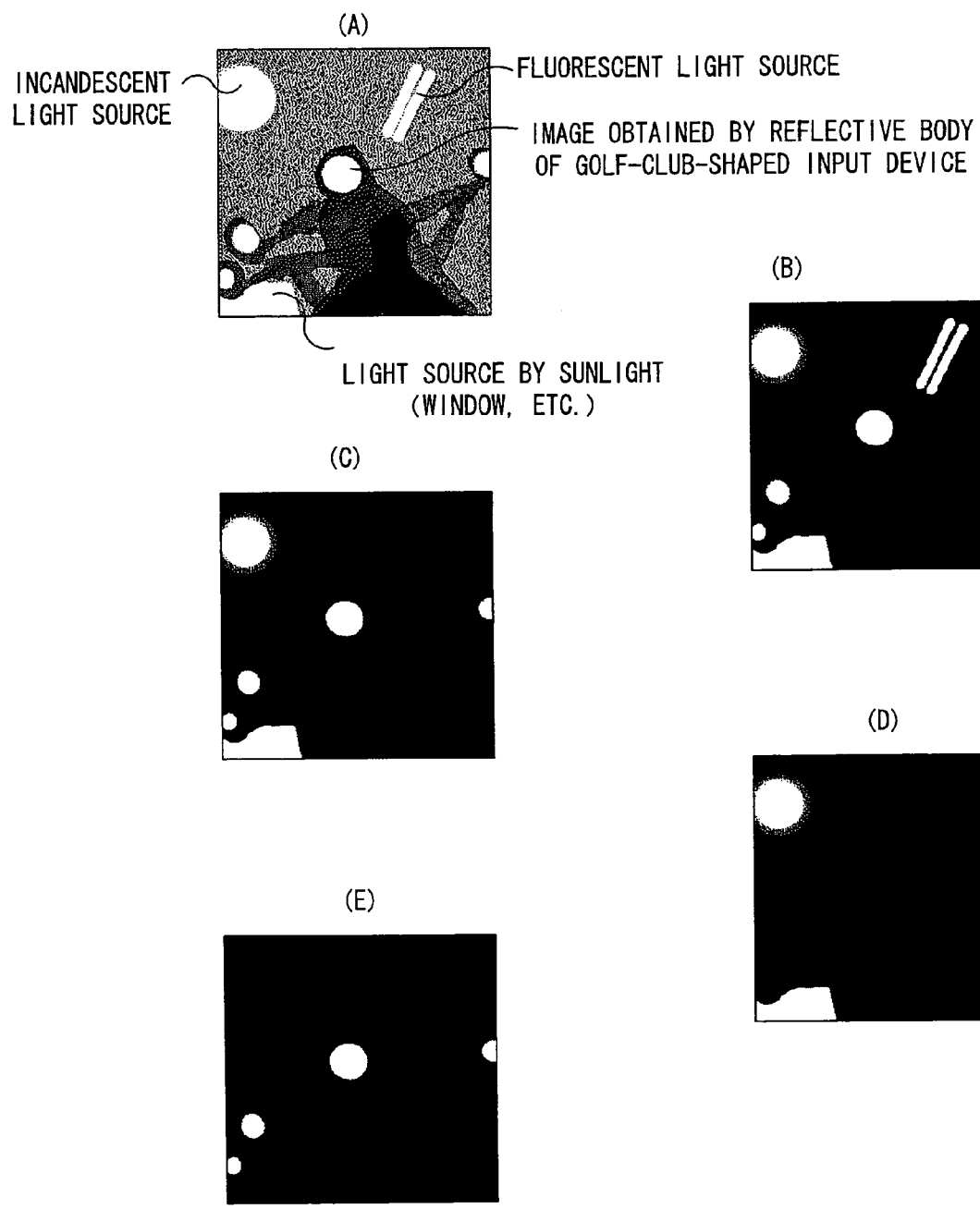
FIG. 19 is an illustrative view showing a principle adopting difference data in embodiments.

That is, in this embodiment, an infrared light is irradiated onto the reflective body 50 of the golf-club-shaped input device 14, and an image by the reflected infrared light incident to the image sensor 40 via the infrared filter is imaged. In a case of strobe-imaging the golf-club-shaped input device 14 in a general room environment by use of a general light source, in addition to the images of the reflective body, images of all things in the room as well as the light source such as the fluorescent light source, an incandescent light source, sunlight (window) are imaged on the image sensor (corresponding to the image sensor 40 in this embodiment) as shown in FIG. 19 (A). Accordingly, in order to process the images in FIG. 19 (A) to extract only the images of the reflective body, a considerably high-speed computer or processor is needed. However, in the game apparatus required to be a low cost, such the high-performance computer is not useable. Thus, it is necessary to perform various processes to reduce a load.

FIG. 19 (B) is an image signal when the image signal in FIG. 19 (A) is subjected to a level discrimination at a certain threshold value. Such the level discriminating process can be executed by a dedicated hardware circuit or in respect of software. However, in any method, when the level discrimination is executed for cutting pixel data having light amounts less than a predetermined amount, low luminance images except for the reflective body and the light source can be eliminated. In the image shown in FIG. 19 (B), a processing of the images except for the reflective body and the light source in the room are omitted, so that, it is possible to reduce the load of the computer while the high luminance images including the light source image is still imaged, and therefore, it is difficult to discriminate between the reflective body and the light source.

Here, in this embodiment, as shown in FIG. 3, by use of the infrared ray filter 44, images except for the images by the infrared ray are not imaged on the image sensor 40. Thus, as shown in FIG. 19 (C), it is possible to eliminate the images of the fluorescent lamp source scarcely including the infrared ray. However, the sunlight and the incandescent lamp are still included in the image signal. Accordingly, in order to further reduce the load, the differences between the pixel data at a time of turning the infrared stroboscope on and the pixel data at a time of turning it off are calculated.

More specifically, the differences between the pixel data of the image data at a time of lighting up shown in FIG. 19 (C) and the pixel data of the image data at a time of lighting out shown in FIG. 19 (D) are calculated. Then, the image by the differences is obtained as shown in FIG. 19 (E). As clearly understood in comparison with FIG. 19 (A), the image by the difference data includes only the images obtained from the reflective body of the golf-club-shaped input device 14. Accordingly, even the game processor 52 low in performance can obtain a moving path of the reflective body 50, that is, the club head 48 (FIG. 4) by the swing of the golf-club-shaped input device 14.

For this reason, in this embodiment, the difference data array shown in FIG. 19 (E), for example, is calculated in a step S105 shown in FIG. 18. After obtaining the difference data array in the step S105, coordinates of a pixel having the largest value (pixel having the largest luminance) is obtained in a step S107, and it is determined whether or not the luminance of the pixel at the coordinates exceeds the predetermined value in a step S109.

If "YES" is determined in the step S109, it is determined whether or not pixels adjacent to the pixel at the coordinates obtained in the step S107, and pixels further adjacent thereto exceed the above-described predetermined value one after another to calculate a diameter Φ [N] of a notable portion (image of the reflective body in the embodiment) in a step S111. The reason why calculating the diameter (or size) of the notable portion is it is necessary that the height (Z coordinate) of the reflective body 50 is obtained in a step S113 and central coordinates of the reflective body are specified in a step S115.

As shown in FIG. 3, an optical system with a single focus is utilized for the imaging unit 28 of this embodiment. Therefore, when the distance between the reflective body 50 and the imaging device, that is, the image sensor 40 is coincident with the focus of the above-described optical system, the image is reduced in blur and increased in diameter. On the contrary thereto, the further the estrangement between the focused distance and the reflective body-image sensor distance is, the smaller the image itself becomes. In an example of FIG. 19 (E) and FIG. 21 described later, the size (diameter) of the image is changed depending upon the distance between the reflective body and the image sensor. Thus, the distance between the reflective body and the image sensor, that is, the height of the reflective body 50 (Z coordinate) can be evaluated on the basis of the diameter (size) of the image of the reflective body. Although in the golf game system of this embodiment, the Z coordinate is not utilized, by utilizing the Z coordinate as necessary, a further different game input can be provided.

Thus, in the step S113, the Z coordinate is obtained, and in the step S115, central coordinates (X, Y or X, Y, Z) are saved.

Then, the N value of the number of times register is incremented in a step S117, and it is determined whether or not the number of times N exceeds a predetermined value in a step S119. If "YES" is determined in the step S119, the process is directly returned to the step S59 in FIG. 15. However, if "NO" is determined, the process is returned to the preceding step S105 to execute the process in the step S105 onward.

It is noted that if "NO" in the step S109, that is, if it is determined the luminance of the pixel having the largest luminance does not exceed the predetermined value, it is determined whether or not all the predetermined number of data has been searched in a following step S121. If "YES" is determined in the step S121, that is, if all the predetermined number of pixels is searched, determining that the notable point is absent, the result of the search is stored in a step S123. It is noted that if "NO" is determined in the step S121, the coordinates data of the pixel having the next largest luminance is obtained in a step S125, and then, the process returns to the step S107.

The notable point extracting process is thus performed in the step S57, and then, a movement calculating process such as calculating the velocity vector, and so forth is executed in a following step S59.

Figure 20:
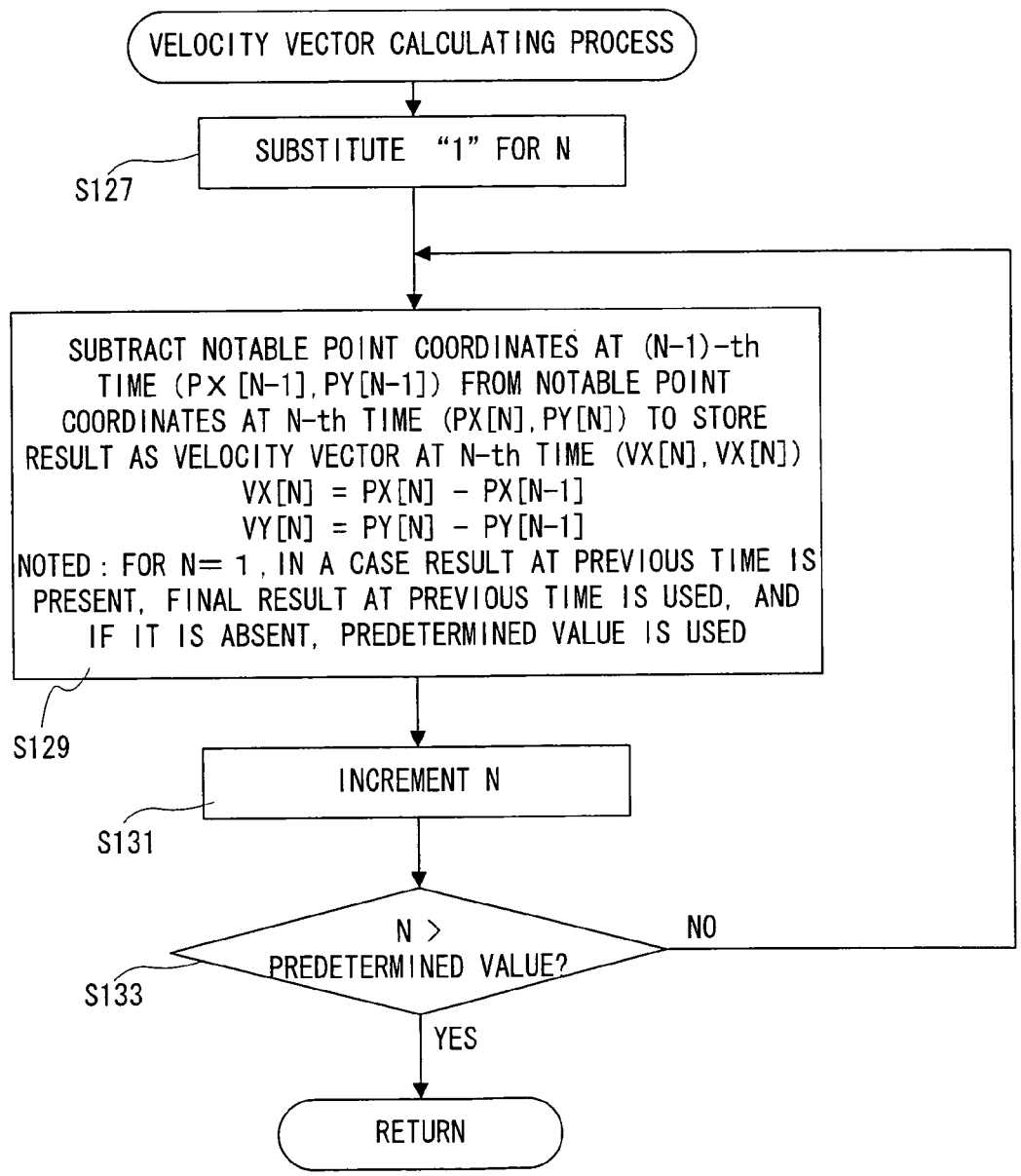
FIG. 20 is a flowchart showing a velocity vector calculating process in FIG. 15 embodiment.
Figure 21:
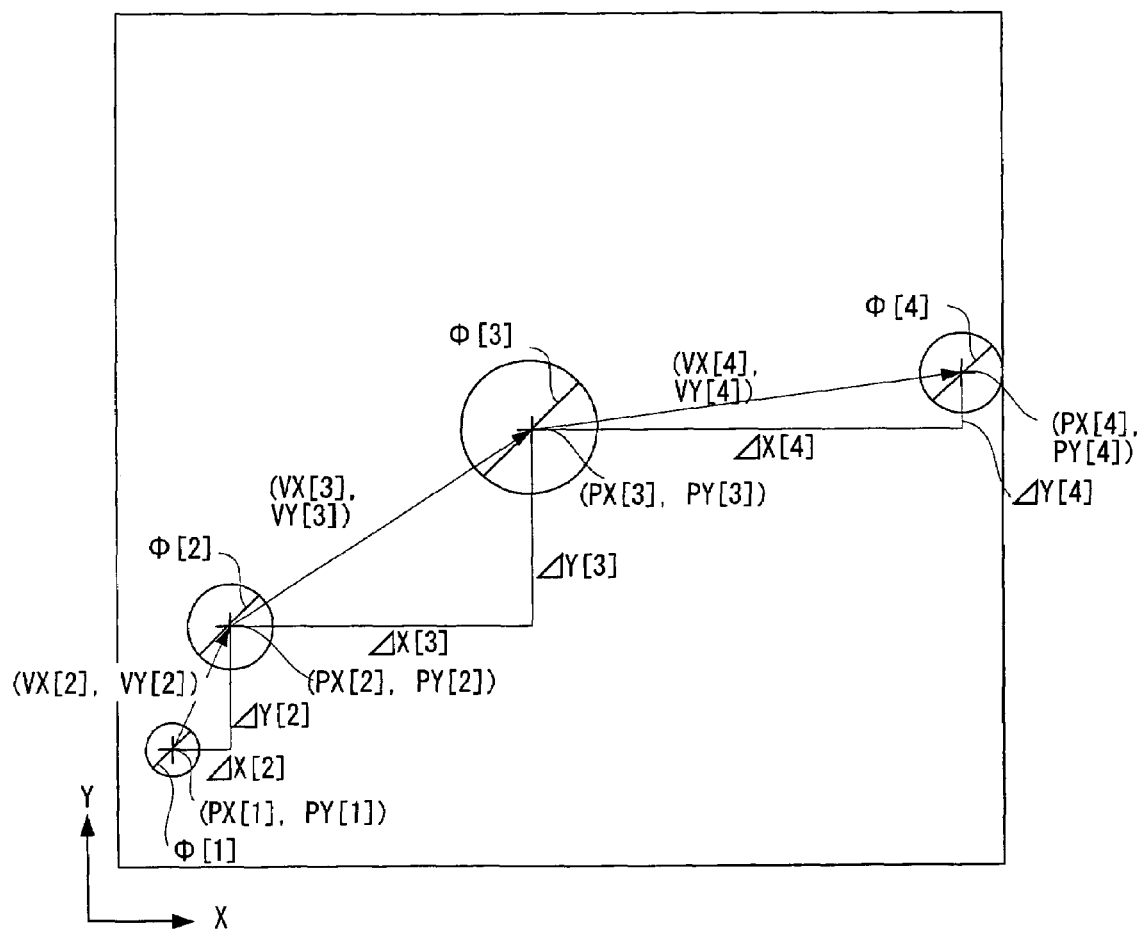
FIG. 21 is an illustrative view showing respective coordinates positions in the velocity vector calculating process.

FIG. 20 shows a detailed embodiment of a velocity vector calculating process as one example of the movement calculating process. In a step S127 in FIG. 20, "1" is substituted for the number of times register N as described above. Then, in a step S129, an N-th velocity vector (VX [N], VY [N]) is calculated by subtracting the (N−1)-th notable point coordinates (PX [N−1] PY [N−1]) from the N-th notable point coordinates (PX [N], PY [N]: FIG. 21) so as to be stored in the internal memory.

FIG. 21 shows an image of the notable area at the first time having a diameter Φ [1], the central coordinates of the notable area at the first time are (PX [1], PY [1]), and the central coordinates of the notable area at the second time having a diameter Φ [2] is (PX [2], PY [2]). Similarly, the notable areas third and the fourth time have diameters Φ [3] and Φ [4], respectively, and the central coordinates thereof are indicated by (PX [3], PY [3]) and (PX [4], PY [4]), respectively.

In a case that the notable area at the second times is the N-th, the (N−1)-th notable area is the notable area at the first time. Thus, in the step S129, the velocity vector in an X direction VX [2] is rendered (PX [2]−PX [1]), and the velocity vector in a Y direction VY [2] is rendered (PY [2]−PY [1]). It is noted that in a case of N=1, due to the absence of the coordinates data of N−1, the velocity vector is calculated by using final result data at the previous time, or by using the predetermined value in a case of the absence of final result data.

It is noted that in FIG. 21, the change amounts ΔX and ΔY of the notable area (reflective body) of each strobe image is also illustrated. Accordingly, if necessary, a change or displacement velocity can be calculated with the use of the change amounts.

After calculating the velocity vector in the step S129, the number of times N is incremented in a step S131, and it is determined whether or not the N reaches the predetermined value in a following step S133. If "NO" in the step S133, the process returns to the preceding step S129 to repeat the process in the step S129.

Figure 22:
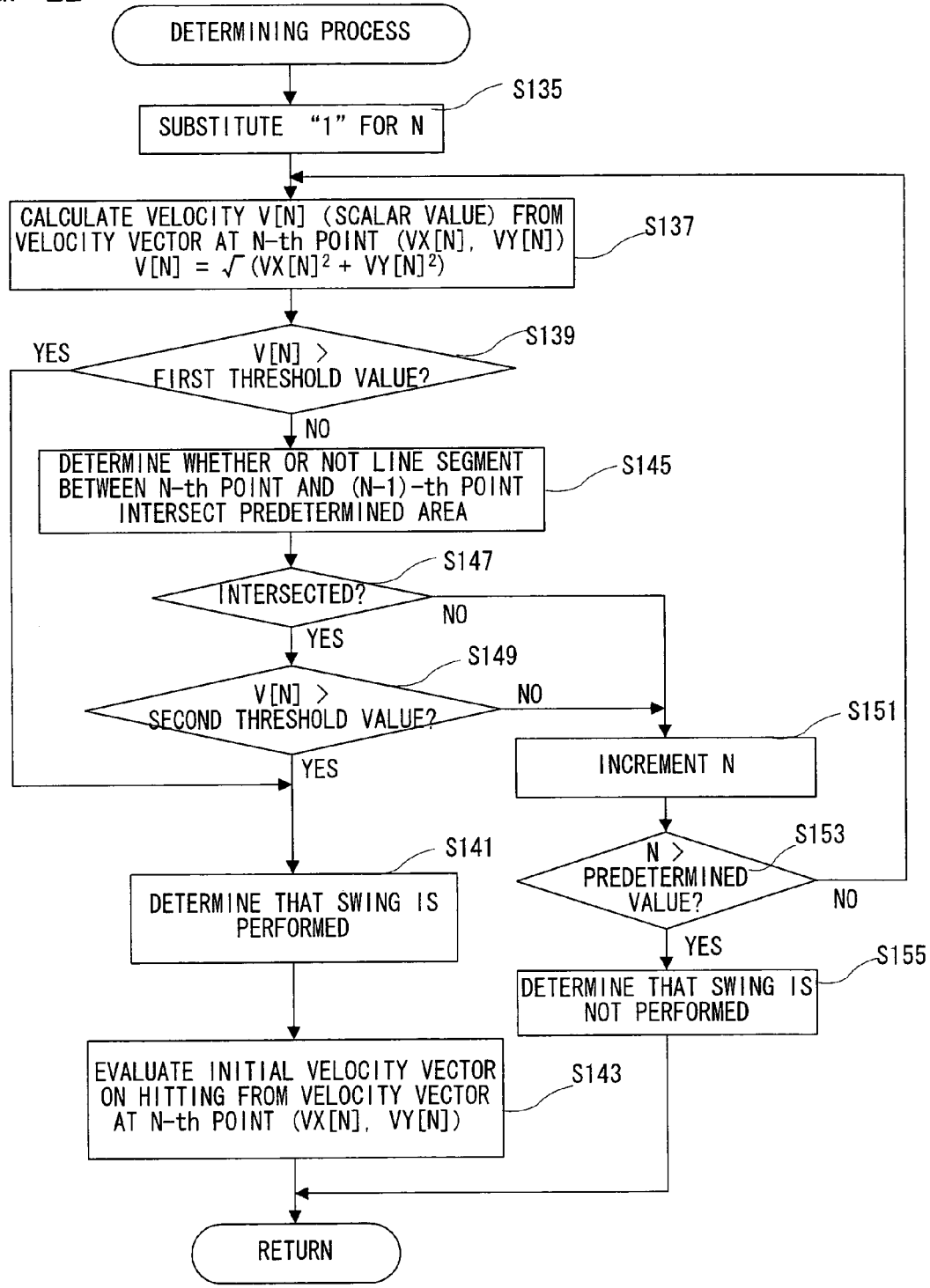
FIG. 22 is a flowchart showing a determination process in FIG. 15 embodiment.

After the process in the step S59, a determining process described in detail in FIG. 22 is executed in a following step S61. In the determining process, it is determined whether or not the golf-club-shaped input device 14 is swung. In a step S135 in FIG. 22, "1" is substituted for N, and then, in a step S137, a velocity V [N] (scalar value) is calculated from the velocity vector at the N-th point (VX [N], VY [N]). Then, it is determined whether or not the velocity V [N] thus calculated exceeds the first threshold value in a following step S139. If "YES" in the step S139, it is directly determined the swing is performed in a step S141, and an initial velocity vector of the golf ball on hitting is evaluated from the velocity vector at the N-th point. Accordingly, in a case of the golf game system in this embodiment, a flying distance can be calculated from the initial velocity vector, the wind direction, the strength of the wind, and the geographical data.

If "NO" in the step S139, that is, if the swung speed of the golf club is below the first threshold value, it is determined whether or not a line segment between the N-th point and the (N−1)-th point intersects a predetermined area in a step S145. Then, as a result of the determination, if "YES" is determined in a step S147, it is determined whether or not the speed at the N-th point (scalar value) exceeds a second threshold value in a step 149. It is noted that the second threshold value is naturally a value smaller than the first threshold value.

If "YES" in the step S149, the process proceeds to a preceding step S141 while if "NO", the process proceeds to the step S151 just as "NO" in the step S147 to increment the value N. Then, it is determined whether N is larger than a predetermined value or not, and if "NO", the process returns to the preceding step S137 to repeatedly execute the steps onward. It is noted that if "NO" is determined in the step S153, that is, in a case that the line segment in the step S145 does not intersect the predetermined region, or even if the line segment intersects that area, in a case the velocity is smaller than the predetermined value, it is determined that the swing is not performed in the end.

Figure 15:
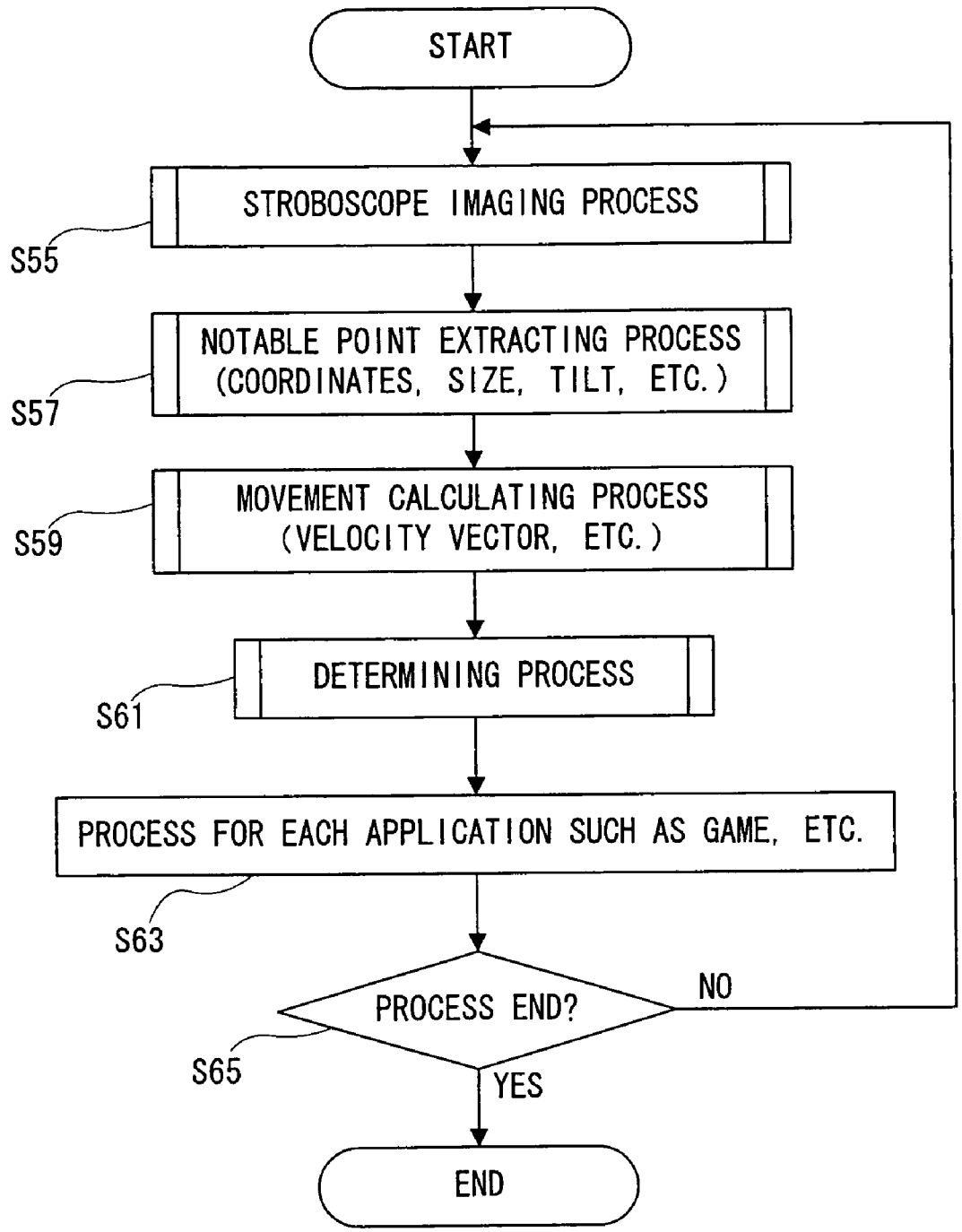
FIG. 15 is a flowchart showing an operation of a game processor in FIG. 2 embodiment.

After completion of the determining process in FIG. 22, the process returns to a step S63 shown in FIG. 15. In the step S63, a process corresponding to the application such as the game and etc. is performed, and in a step S65, it is determined whether or not the process is ended (game over in a case of the game), and if "YES", the process is ended.

It is noted that in the above-described embodiment, the circle-shaped reflective body 50 is provided on the golf-club-shaped input device 14, the initial velocity vector is evaluated from the moving path, and regarding that the golf ball is hit at the initial velocity, the flying distance of the ball is calculated. That is, the rotation applied to the ball is ignored. This is because that it is impossible, if using the circle-shaped reflective body, to specify the orientation of the golf-club-shaped input device 14. Here, in a next embodiment, it is rendered the orientation of the golf-club-shaped input device 14 can also be calculated.

Figure 23:
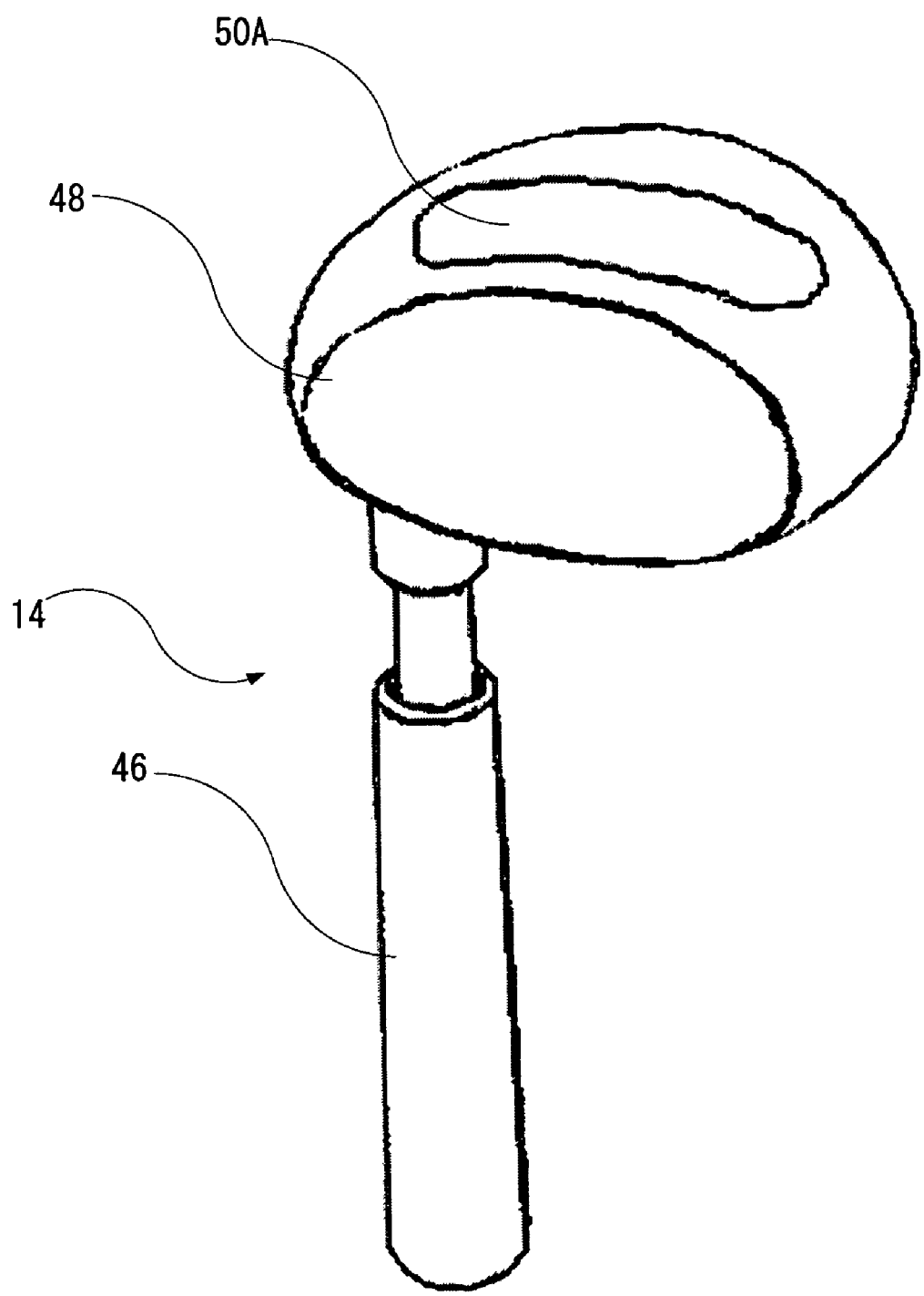
FIG. 23 is an illustrative view showing a modified example of the golf-club-shaped input device utilized in the golf game system.

In order to attain this, in the next embodiment, the golf-club-shaped input device 14 shown in FIG. 23 is utilized. In this embodiment, an oval-shaped or rectangular-shaped reflective body 50A is utilized while the circle-shaped reflectivity body is utilized for the golf-club-shaped input device shown in the preceding FIG. 4.

Figure 24:
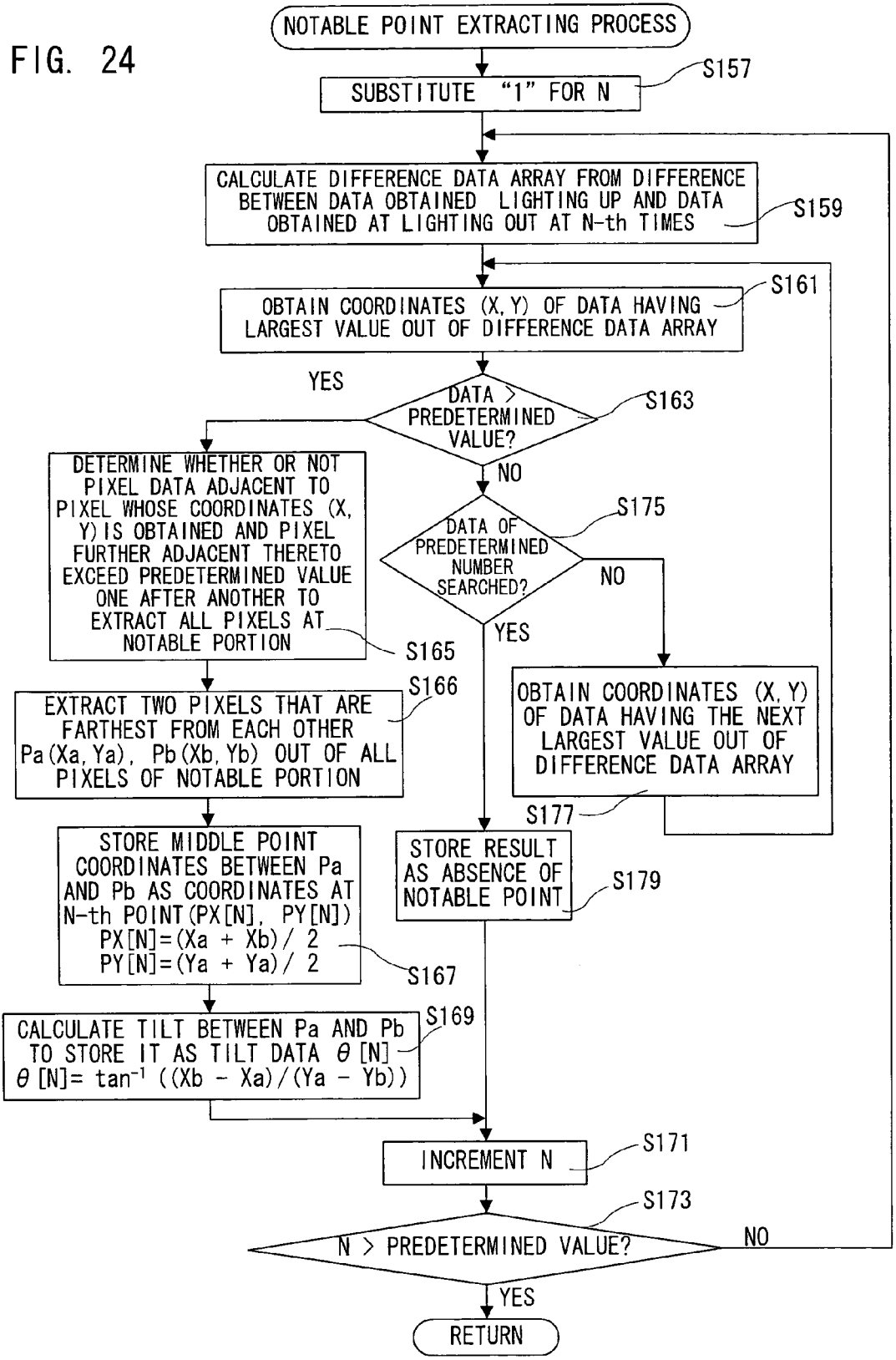
FIG. 24 is a flowchart showing the notable point extracting processing operation in a case of utilizing the golf-club-shaped input device in FIG. 23.

Then, after the respective pixel data at a time that the light-emitting diode 42 lights up and pixel data at a time the LED 42 lights out are fetched in the steps S55 of FIG. 15, the notable point extracting process shown in FIG. 24 is executed. It is noted that the steps S157-S163 are the same as the steps S103-109 in FIG. 18.

Figure 26:
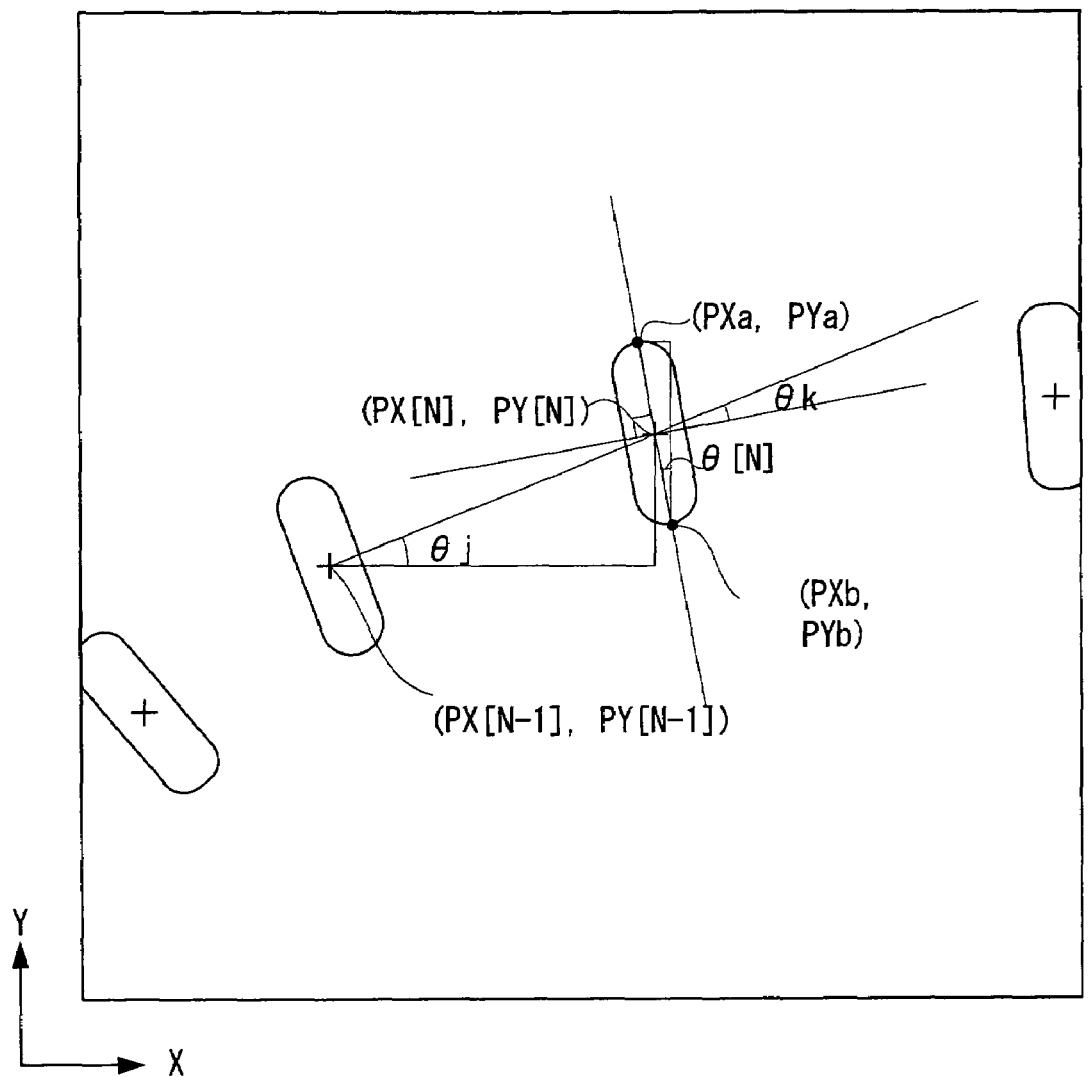
FIG. 26 is an illustrative view showing an angle in the determination processing operation in FIG. 25.

Then, in a following step S165, it is determined whether or not pixels adjacent to the pixel of the coordinates obtained in the step S161 and a pixel adjacent to the pixel exceed the predetermined value one after another to extract all the pixels at the notable point (image of the reflective body in this embodiment). Then, in a step S166, two pixels of Pa (Xa, Ya) and Pb (Xb, Yb) that are the farthest from each other are extracted out of all the pixels of the notable point. The two points, as shown in FIG. 26, indicate both ends of the rectangular-shaped reflective body 50A in the direction of the length. There are no points that are the farthest from each other except for the both ends of the long side.

Then, in a step S167, middle point coordinates between the two points Pa and Pb are stored as the coordinates at N-th point (PX [N], PY [N]) in the memory. Then, in a step S169, a tilt between the Pa and the Pb is calculated so as to be stored as angle data θ [N] as shown in FIG. 26. It is noted that the tilt θ [N] is, as shown in the step S169, calculated as an arc tangent of (Xa−Xb)/(Ya−Yb).

Thus, the direction of the golf-club-shaped input device 14 with respect to the imaging device is obtained as the angle data θ [N].

The steps S171-S179 in FIG. 24 respectively are the same as the steps S117-S125 in FIG. 18.

Figure 25:
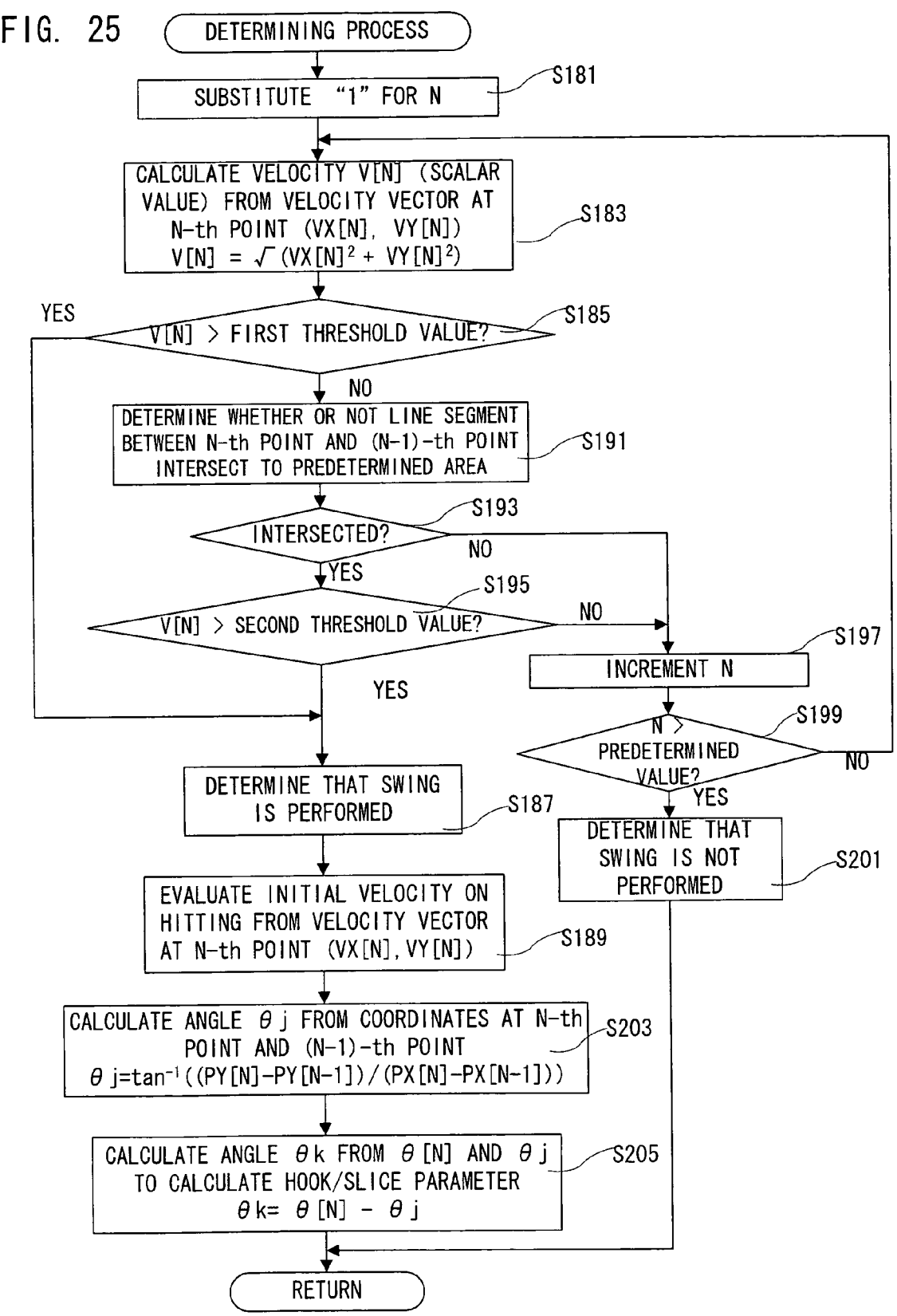
FIG. 25 is a flowchart showing a determination process in FIG. 15 embodiment in a case of utilizing the golf-club-shaped input device in FIG. 23.

Then, in the next determining process, the respective steps shown in FIG. 25 are executed. However, steps S181-S189 and steps S191-steps S201 are the same as the steps S135-S143 and the steps S145-S155 shown in FIG. 22, respectively.

In a step S203 in FIG. 25, the angle θ j (FIG. 26) is calculated by the coordinates at N-th point and the coordinates at (N−1)-th point. The angle θ j can be calculated by the arc tangent (PY [N]−PY [N−1])/(PX [N]−PX [N−1]) as shown in the step S203. In a step S205, a tilt θ k (=θ [N]−θ j) of the golf-club-shaped input device 14 with respect to the direction of the swing of the golf-club-shaped input device 14 is calculated according to an equation shown in the step S205, and a hook/slice parameter on hitting is calculated from the θ k. Thus, by obtaining the hook/slice parameter, changing a flying direction due to the spin of the ball as well as simply changing the flying distance can be added, and therefore, it is possible to provide a more reality and interest to the golf game system of this embodiment.

Figure 27:
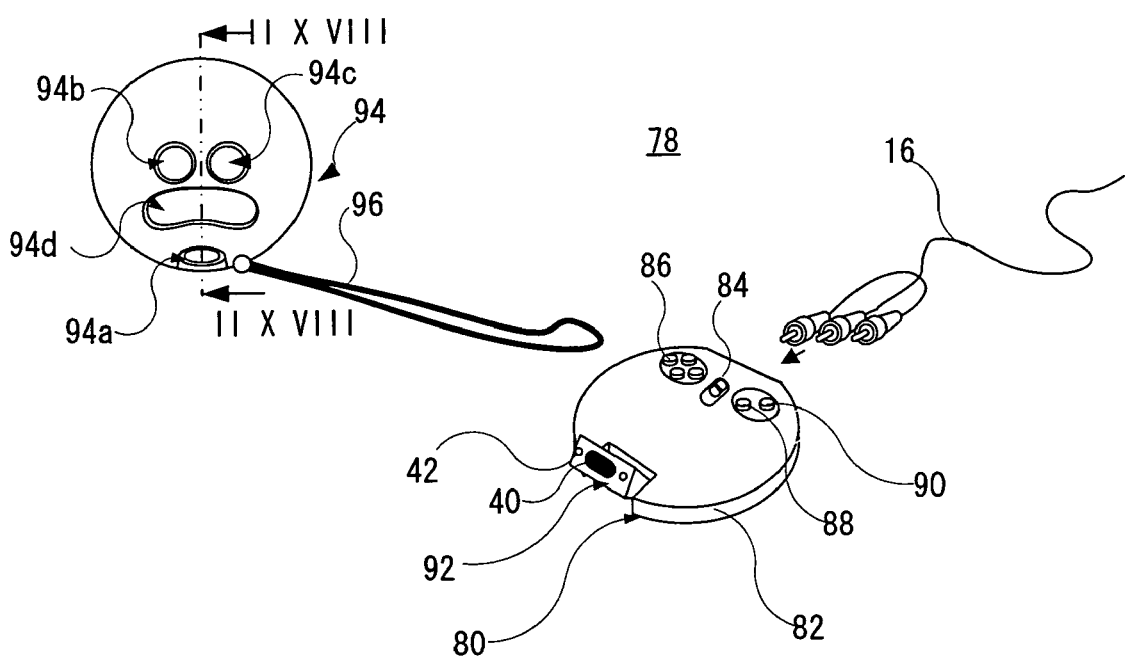
FIG. 27 is an illustrative view showing an entire configuration of a bowling game system of another embodiment of the present invention.
Figure 28:
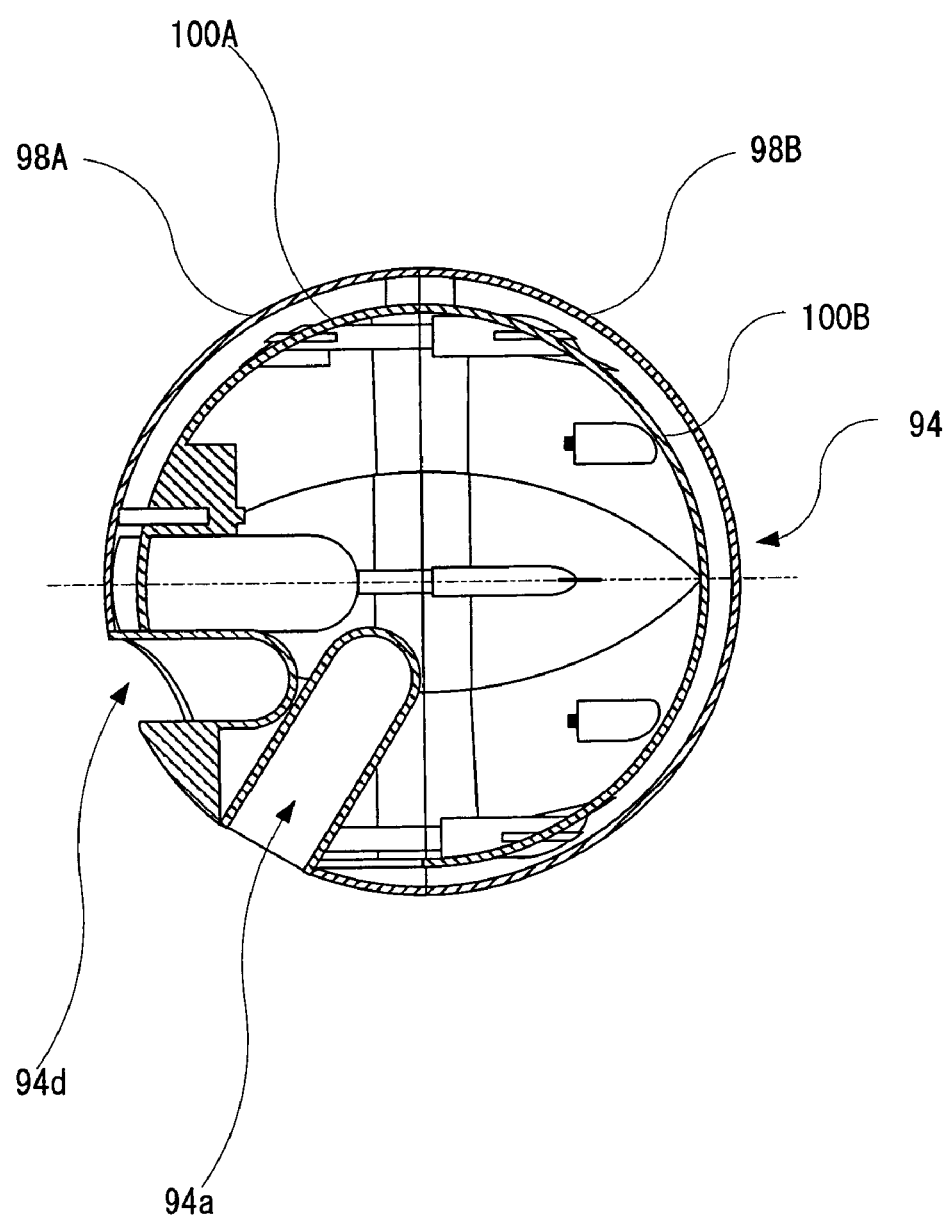
FIG. 28 is a sectional illustrative view showing an internal configuration of a ball-shaped input device shown in FIG. 27 at a line XXVIII-XXVIII.

With referring to FIG. 27, a bowling game system 78 of another embodiment according to this invention includes a game machine 80, and the game machine 80 is driven by an AC adaptor or a battery, and connected to an AV terminal (not shown) of a television monitor (not shown) through an AV cable 16 similarly to the game machine 12 in the game system in FIG. 2.

The game machine 78 further includes a housing 82, and on the housing 82, a power switch 84 is provided, and a direction button 86, a determination key 88, and a cancel key 90 are also provided. These buttons or operation keys have the same function as corresponding ones in FIG. 2.

A part of the housing 82 of the game machine 80 is partly cut away, and at that place, a movable body 92 is rotatably supported in an elevation direction. On the side surface of the movable body 92, the imaging unit 28 described with referring to FIG. 3 is housed, and therefore, the movable body 92 is provided with an image sensor 40 similarly to the above-described one. Then, an infrared-LED 42 is provided on the side surface of the movable body 92 in proximity to the image sensor 40 and in an integrated manner with the image sensor 40 so as to be moved in the elevation direction, and constitutes a stroboscope imaging means.

The movable body 92 is supported such that it has constant degree of freedom in the elevation direction in this embodiment. However, the degree of freedom may be provided in a revolution direction in place of the elevation direction, or in addition to the elevation direction. Specifically, the movable body 92, that is, the image sensor 40 and the infrared-LED 42 are provided changeable in an arbitrary direction.

It is noted that if a wider angle lens is used as the lens of the image sensor 40 (concave lens and convex lens in FIG. 4), the image sensor 40 needs not to be movable, and alternatively fixedly attached to the image sensor 40.

A ball-shaped input device 94 has holes 94a, 94b, and 94c into which three fingers of the user, that is, a thumb, a middle finger, and a ring finger are respectively inserted as does in the real bowling game, and is provided with a wider hole 94d into which a child can insert any one or a plurality fingers except for the thumb. Then, a strap 96 is provided, and therefore, the game player equips it in his arms (upper arm or front arm) in order to assure the safety of the player. That is, the ball-shaped input device 94 is coupled to his arm by the strap 96, and therefore, even if the game player releases the ball-shaped input device 94 from his fingers as does in the real bowling game, it is possible to prevent accidents of the ball-shaped input device 94 being flown away, being hit against the player himself or others, and so forth.

Furthermore, the ball-shaped input device 94 in this embodiment forms the housing of the ball-shaped input device 94 by connecting transparent or translucent hemisphere outer shells 98A and 98B to each other by bosses, and inside the hemisphere outer shells 98A and 98B, hemisphere inner shells 100A and 100B that are similarly coupled to each other by bosses are fixed. Then, a reflective sheet is pasted on the surface of the respective hemisphere inner shells 100A and 100B to form a reflective body. That is, the inner shells become the reflective body. Accordingly, the reference numeral 100 is assigned to the reflective body in this embodiment.

Figure 29:
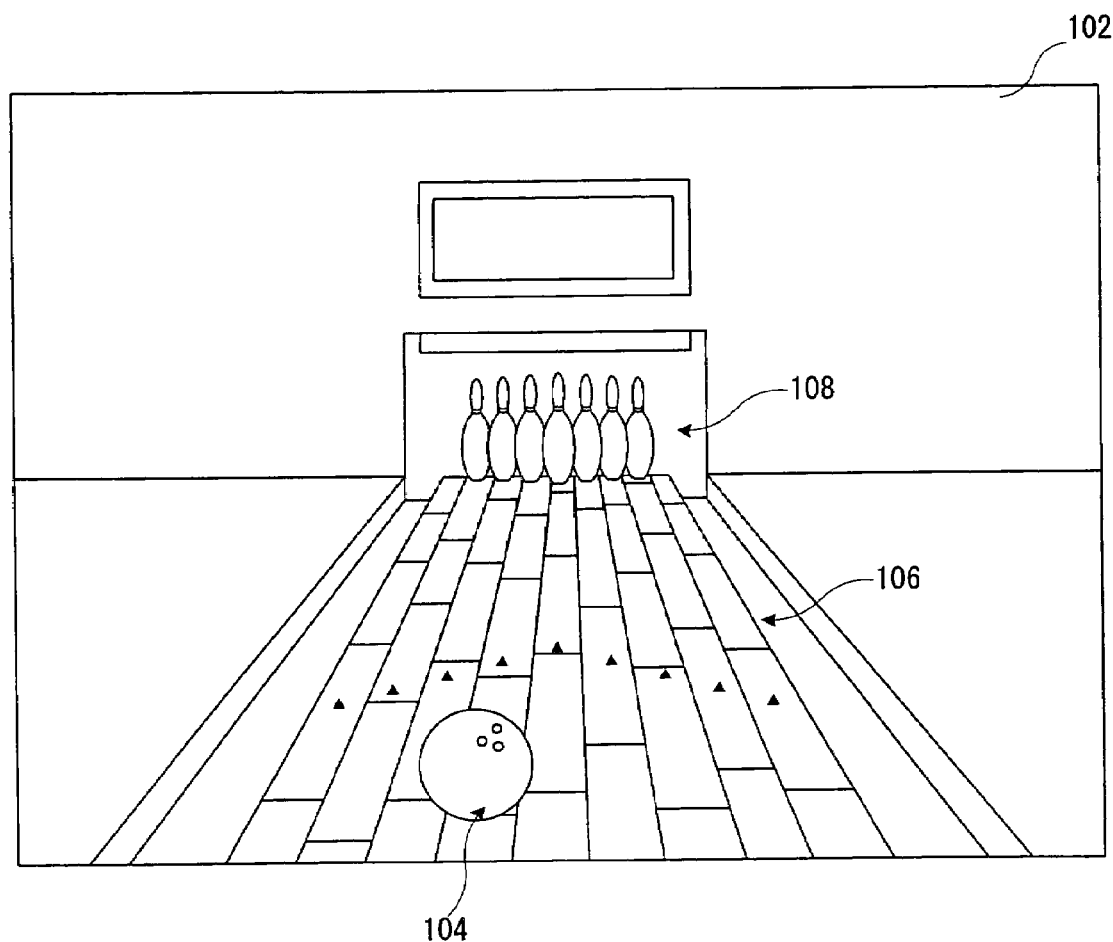
FIG. 29 is an illustrative view showing one example of a game screen to be displayed on a television monitor in FIG. 27 embodiment.

Furthermore, in the bowling game system 78 in this embodiment, the movement of the ball-shaped input device 94 is detected by the stroboscope, and whereby, a position of a bowling ball 104 is controlled on a game screen 102 as shown in FIG. 29. The game screen 102 is displayed as a perspective image viewed from a viewpoint of the user or the player. That is, on the game screen 102, a bowling lane 106 and pins 108 arranged in a depth direction are displayed. On the game screen, the bowling ball 104 is moved on the lane 106, and in correspondence to a reached position and intensity, the pins are knocked down as do in the real bowling game. It is noted that if from directly before the bowling ball 104 hit the pins 108, an enlarged image of the pins portion is displayed on the window (not shown) at the center of the screen, for example, so much presence can be provided to the players.

It is noted that every time that the player finish throwing the ball, the game screen 102 shown in FIG. 29 and a score sheet shown in FIG. 30 are switchably displayed. Then, in a case that a plurality of game players play the game, the scores of the respective players are simultaneously displayed. FIG. 30 example shows an example in which four game players simultaneously go in the bowling game.

In the bowling game system 78, when the player performs an throwing action in a real space by use of the ball-shaped input device 94, the game processor 52 (FIG. 31) intermittently turns the infrared-LED 42 on, and intermittently detects the positions of the ball-shaped input device 94 by analyzing and processing the images of the CMOS image sensor 40 at each lighting-up time and lighting-out time. Then, in correspondence to the positions (coordinates) of the ball-shaped input device 94, the movement of the bowling ball 104 is controlled to knock down zero or more pins.

Figure 31:
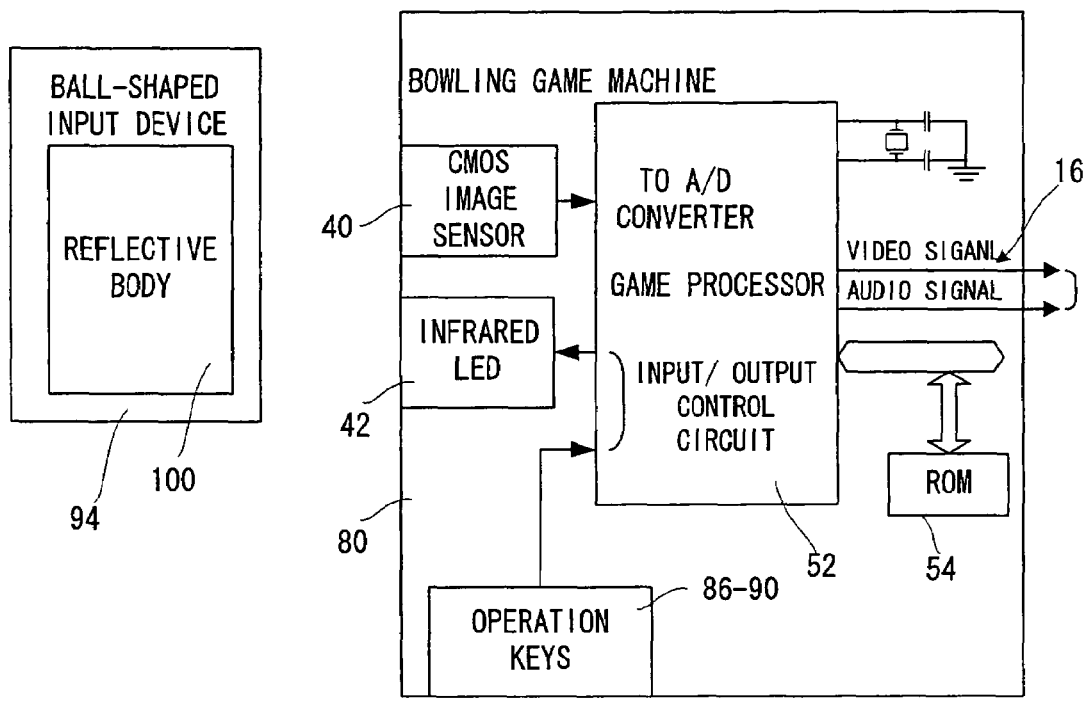
FIG. 31 is a block diagram showing FIG. 27 embodiment.

With referring to FIG. 31, the ball-shaped input device 94 as described above is irradiated by a light emission from the infrared-LED 42, and reflects the infrared ray by the reflective body 100. The reflected light from the reflective body 100 is imaged by the CMOS image sensor 40, and whereby, an image signal of the reflective body 100 is output from the CMOS image sensor 40. It is noted that the other part is the same as the golf game system 10 shown in FIG. 5.

Figure 32:
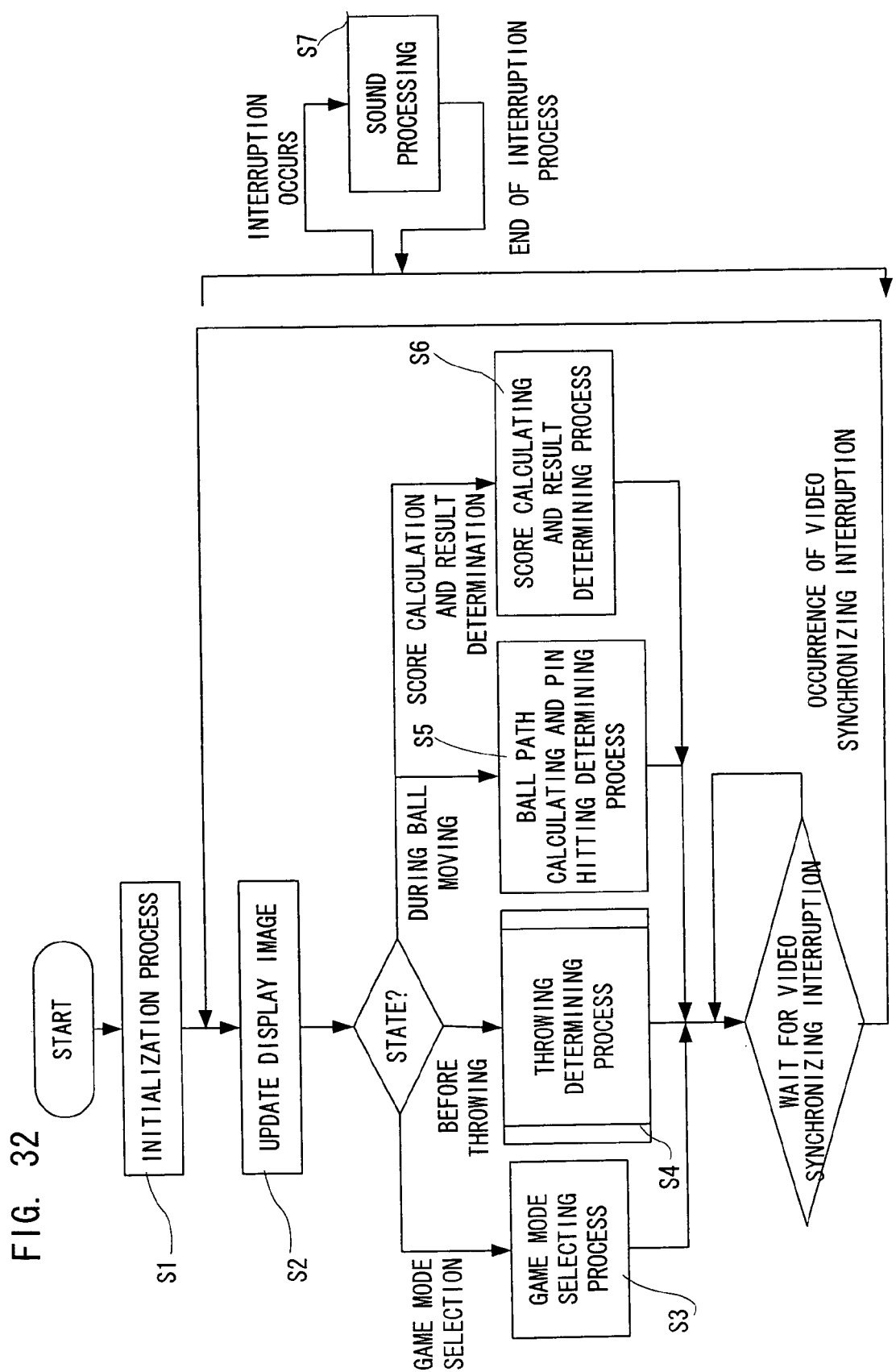
FIG. 32 is a flowchart showing an entire operation of FIG. 27 embodiment.

Herein, with referring to FIG. 32, an operation of the bowling game system 78 in this embodiment is schematically described. After a power switch 84 is turned on to start a game shown in FIG. 27, the game processor 52 shown in FIG. 31 first executes an initializing process in a step S1. More specifically, systems and respective variables are initialized. It is noted that a detailed method of the initialization is described above.

Then, after the step S1 in FIG. 32, the game processor 52 updates an image signal to update an image to be displayed on the monitor 20 in a step S2. It is noted that the update of the display image is executed every one frame (television frame or video frame).

Then, the game processor 52 executes a process depending on the state (status). It is noted that a process to be executed first is a game mode selection. In the game mode selection, the user or the game player selects the game mode such as an one-player mode, a two-player mode, etc. by operating the selection key 86 shown in FIG. 27, and sets a difficulty level of the game in a step S3 in FIG. 32.

Although in the real bowling game, it is necessary to throw the ball on the lane, in the bowling game system 10 in this embodiment, a throwing action is performed by use of the ball-shaped input device 94 as described above. Here, the game processor 52 executes a throwing determining process to determine whether or not the throwing action is performed in a step S4. Then, if the throwing action is performed, when the ball 104 moves on the lane 106 (the both in FIG. 30), the ball path is calculated and a hitting determining process of the ball 104 against the pins 108 (FIG. 30) is executed in a step S5. Then, when the ball 104 reaches the end of the lane 106, a score calculating and result determining process is executed in a step S6 as the result of the pin hitting determining process in the step S5.

It is noted that in the bowling game system 78 in this embodiment, by imaging the reflective body 100 with the stroboscope, the game input is performed, and this is the same as the preceding embodiment. Accordingly, this embodiment is different from the preceding embodiment in only the determining processing in the step S61 in FIG. 15.

Figure 33:
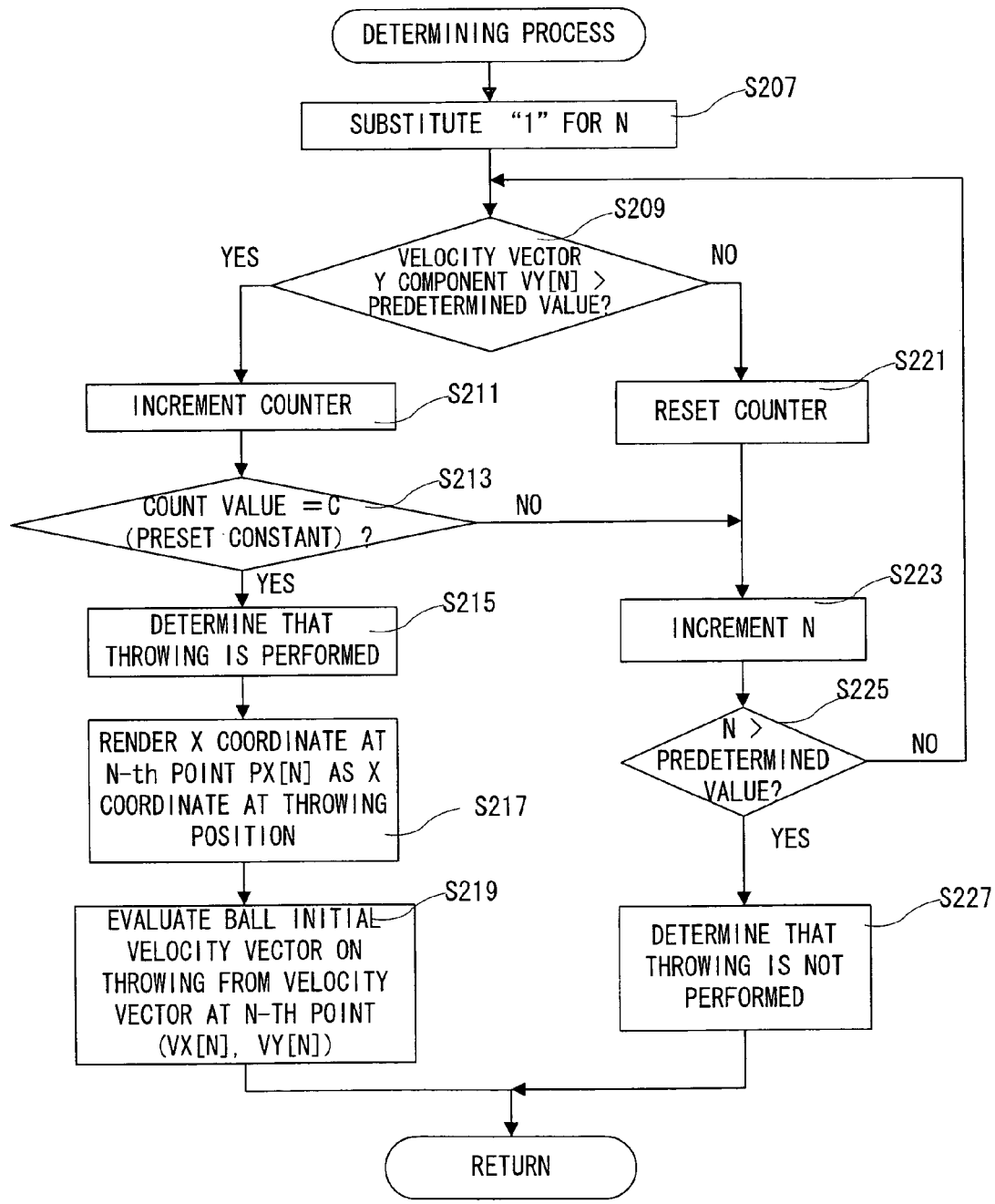
FIG. 33 is a flowchart showing a determination process in FIG. 15 embodiment in the bowling system in FIG. 27.

The throwing determining process step is shown in detail in FIG. 33, and an N value is set to "1" in a first step S207. Then, in a step S209, it is determined whether or not a Y component of the velocity vector (component in up and down directions) VY [N] (FIG. 21) exceeds a predetermined value. If "YES" in the step S209, the process proceeds to a step S211 to increment a counter formed in an internal memory, for example. Then, in a next step S213, it is determined whether or not a count value of the counter is a predetermined constant C (for example, "3"). If "YES", it is determined that a throwing action is performed in a step S215. In a succeeding step S217, the X coordinate PX [N] at the N-th point is rendered as the X coordinate at the throwing position, and in a step S219, an initial velocity of the ball on throwing is evaluated from the velocity vector at N-th point (VX [N], VY [N]). Then, according to the initial velocity, regarding that the bowling ball is thrown, the game processing is executed.

It is noted that if "NO" in the step S209, the above-described counter is reset in a step S221. Accordingly, the throwing action is not determined until the Y component of the velocity vector exceeds the predetermined value successive three times, for example. Thus, it is possible to prevent an undesired action of the game player from being reflected on the game.

After the step S221, the N value is incremented in a step S223, and it is determined whether or not the N value reaches a predetermined value in a step S225. If "YES" is determined, it is determined that the throwing is not performed in a step S227. Then, the process returns to the step S63 in FIG. 15 similarly to the step S219 onward.

Figure 34:
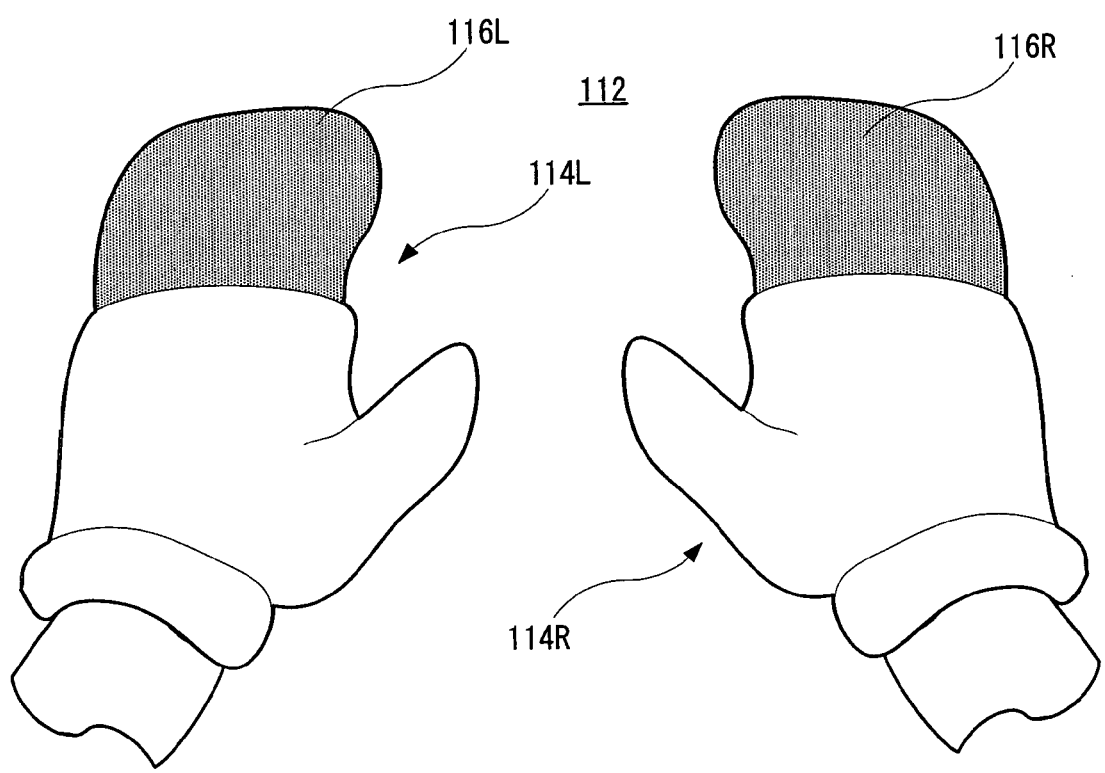
FIG. 34 is an illustrative view showing one example of a glove-shaped input device.

FIG. 34 shows another embodiment of an input device utilizing a stroboscope. The input device 112 of this embodiment is a glove-shaped input device. The glove-shaped input device 112 includes gloves 114L and 114R to be attached to both right and left hands, and reflective bodies 116L and 116R in the form of the reflective sheet are provided at predetermined positions (the tip end portion) of the gloves 114*l* and 114R. These reflective bodies 116L and 116R are respectively formed as a part of the gloves 114L and 114R, and alternatively may be pasted on the gloves 114L and 114R.

Then, in order to apply an input signal, the user puts on the gloves 114L and 114R, and moves both hands over the imaging unit 28 (FIG. 3) of the game machine 80 shown in FIG. 27, for example. Then, according to the step S55 in FIG. 15 described above or FIG. 16, both of the reflective bodies 116L and 116R are irradiated by the infrared-LED 42, or not irradiated, and imaged by the image sensor 40. Then, according to the step S57 in FIG. 15, that is, FIG. 18, a notable point (two reflective bodies 116 and thus two notable points in this embodiment) is extracted. Thereafter, an action calculating or detecting process is executed by applying the process in the step S59 in FIG. 15. It is noted that in a case of utilizing the glove-shaped input device 112 in FIG. 34, a modification is applied to the step S59 as shown in FIG. 35.

Figure 35:
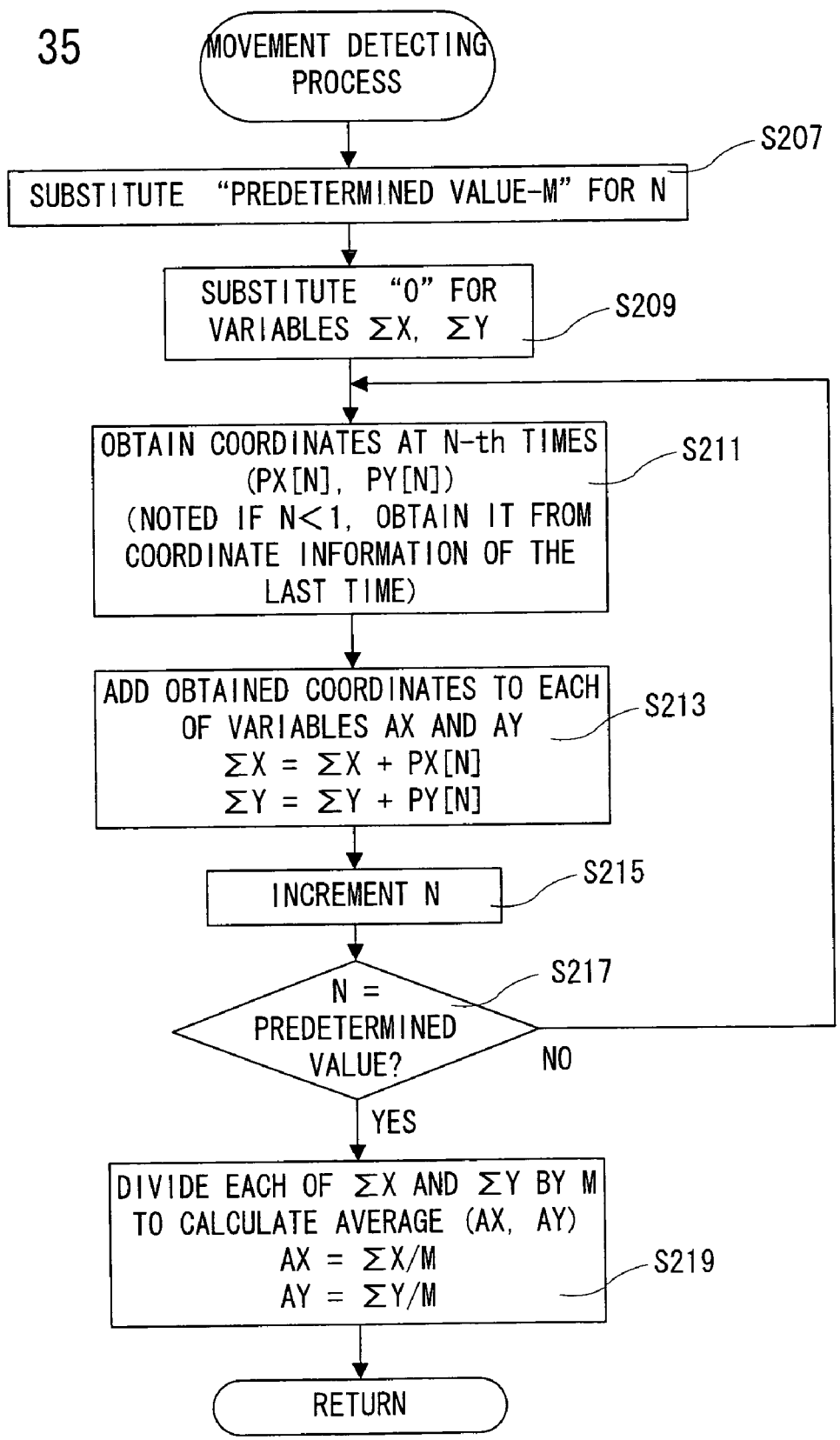
FIG. 35 is a flowchart showing a movement detecting processing operation shown in FIG. 15 embodiment in a case of utilizing the glove-shaped input device in FIG. 34.

In a flowchart shown in FIG. 35, a moving average is detected or calculated to obtain an input. Describing in detail, in a first step S207, a "predetermined value −M" is set to the number-of-times register N. Next, in a step S209, "0" is set into the variables Σ X and Σ Y.

In a step S211, coordinates (PX [N], PY [N]): FIG. 21) at N-th time are obtained. It is noted that in a case of N<1, coordinates data is obtained from coordinate information of the last time. In a succeeding step S213, the coordinates obtained in the step S211 are respectively added to the variables Σ X and Σ Y initialized in the step S209 to update the variables Σ X and Σ Y. This process is repeated until it is detected in a step S217 that the number of times N incremented in the step S215 reaches the predetermined value. Accordingly, the game processor 52 stores, at this time, the variables Σ X and Σ Y to which M sets of coordinates are added. Then, in a step S219, each of the variables Σ X and Σ Y is divided by the number M to calculate the moving average (AX, AY). By use of the moving average AX, AY, the game processor 52 changes positions of moving objects that can be operated by the player on the game screen.

It is noted that the present invention can be embodied or modified except for the above-described embodiments.

For example, in the embodiment shown in FIG. 2, the input is performed by the use of the golf-club-shaped input device 14. However, by utilizing the similar system, a number of modifications are conceivable including a baseball game apparatus by use of a bat-shaped input device for baseball and/or a ball-shaped input device for baseball, a table tennis game by use of a racket-shaped input device for table tennis, a tennis game by use of a racket-shaped input device for tennis, etc.

Furthermore, a modification of soccer game apparatus is also conceivable, in which by attaching an input device provided with a reflective body around the part of the lower leg or the ankle, a position, velocity, a pattern of a moving path of the leg of the player are used as an input signal.

In addition, as to the embodiment utilizing the glove-shaped input device shown in FIG. 34, a moving average value calculated in the flowchart in FIG. 35 is utilized as an input signal. Here, modifications including a boxing game apparatus and a dancing game apparatus are conceivable, in which a position, a moving velocity, a moving path of the glove-shaped input device are calculated to be used as an input signal. Furthermore, in these modified examples, in place of the glove-shaped input device, a wristband shaped input device wrapped around the wrist secures the same effect as the glove-shaped input device.

A further modification including a dancing game apparatus utilizing the arms and the legs is conceivable, in which the above described input device wrapped around the leg is used in combination with the glove-shaped input device shown in FIG. 34 or the wristband shaped input device.

In addition, other modifications including a sword battle game apparatus are conceivable, in which like the golf-club-shaped input device 14 shown in FIG. 23, the long-thin shaped reflective body 50A is pasted on the input device in the form of a sword, and an angle, a position, a moving velocity, a moving path of the sword are used as an input device.

According to this invention, an object is imaged by use of the stroboscope and the imaging means, and on the basis of the difference between the plurality of image signals at a time of lighting up and an image signal at a time of lighting out, a part or all of the information of the position, the size, the velocity, the acceleration, and the moving path pattern are calculated. The information processing apparatus and an entertainment apparatus execute the information processing, the game, and other entertainment processing by use of the information.

It is noted that although all the information processing is executed by a single game processor in the above-described embodiment, entire processing can be shared with the use of two or more processors or computers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus provided with an input system utilizing a stroboscope, comprising:

a stroboscope including a light source outputting a light of a specific wavelength range;

a base unit which includes a supporting cylinder having an opening and a lens provided below said opening in said supporting cylinder;

a filter provided so as to cover said opening of said supporting cylinder and passing only the light of said specific wavelength range;

a first object including a first retroreflective body; said light source being provided in the vicinity of said filter so as to light up said first object;

an imager, which is provided within said base unit and below said lens, imaging said first object at a light-emission and at a non-light-emission of said stroboscope to produce a plurality of image signals at light-emission and a plurality of image signals at non-light emission;

a calculator calculating a part or all of information of a position, a size, a velocity, an acceleration, a moving path pattern of said first object by detecting a first notable portion in correspondence to said first retroreflective body from a difference between said image signals at light-emission and said image signals at non-light emission; and an information processor performing information processing according to an application on the basis of the information calculated based on said difference by said calculator to provide an output according to said application.

2. An information processing apparatus according to claim 1, wherein said calculator includes a determiner determining whether or not said information based on said difference is coincident with a predetermined condition, and further includes a valid input transmitter transmitting said information based on said difference to said processor as the valid information being performed only if said determiner determines that said information based on said difference satisfies said predetermined condition.

3. An information processing apparatus according to claim 1, wherein said calculator includes a distance calculator extracting said first notable portion from said difference and calculating a distance between said first object and said imager from the information indicative of a size of said first notable portion.

4. An information processing apparatus according to claim 1, wherein said calculator includes an extractor extracting a shape of said first notable portion from said difference between said image signal at light-emission and said image signal at non-light emission, and a first angle calculator calculating a first angle indicative of an inclination of said shape corresponding to said first object.

5. An information processing apparatus according to claim 4, wherein said extractor extracts predetermined two points within said first notable portion, and the calculation of the first angle by said first angle calculator is for calculating an angle between a line segment between the predetermined two points and a predetermined coordinate axis.

6. An information processing apparatus according to claim 4, wherein said calculator includes a swing direction calculator calculating a swing direction of said first object on the basis of a movement of said first notable portion, and a second angle calculator calculating a second angle indicative of an inclination of said first object with respect to said swing direction on the basis of said swing direction calculated by said swing direction calculator and said first angle calculated by said first angle calculator.

7. An information processing apparatus according to claim 6, wherein said information processor includes a parameter calculator calculating a parameter of a hook/slice in hitting a ball on the basis of said second angle.

8. An information processing apparatus according to claim 1, wherein a time interval of the light-emission of said stroboscope is freely settable.

9. An information processing apparatus according to claim 1, wherein a length of the light-emission and a length of the non-tight-emission of said stroboscope are freely configurable.

10. An information processing apparatus according to claim 1, wherein an exposure period of said imaging means is freely configurable.

11. An information processing apparatus according to claim 1, wherein said imager includes an imaging device for imaging only said light having the specific wavelength range.

12. An information processing apparatus according to claim 1, wherein each of said calculation of said calculator and said information processing of said information processor are processed by a single or a plurality of processors.

13. An information processing apparatus according to claim 1, wherein the information processing performed by said information processor is an entertainment processing such as a game, etc.

14. An information processing apparatus according to claim 1, wherein said information processor includes a moving object controller controlling a movement of a moving object displayed on a screen based on said information calculated based on said difference by said calculator.

15. An information processing apparatus according to claim 14, wherein said calculator includes a determiner determining whether or not said information based on said difference is coincident with a predetermined condition, and said moving object controller gives a change on said moving object in said screen if said determiner determines that said information based on said difference satisfies said predetermined condition.

16. An information processing apparatus according to claim 15, wherein said determiner determines whether said first object was swung on the basis of the speed of said first object.

17. An information processing apparatus according to claim 16, wherein said determiner determines that said first object was swung when the speed of said first object becomes equal to or larger a predetermined value in a plurality of succeeding times.

18. An information processing apparatus according to claim 16, wherein said moving object controller calculates an initial speed of said moving object on said screen on the basis of the speed of said first object calculated by said calculator if and when said determiner determines that said first object was swung.

19. An information processing apparatus according to claim 18, wherein said moving object on said screen is an image of a ball for golf game.

20. An information processing apparatus according to claim 14, wherein said moving object controller controls a movement of said moving object of said screen on the basis of the position of said first object calculated by said calculator.

21. An information processing apparatus according to claim 14, wherein said moving object controller calculates an initial speed of said moving object on said screen on the basis of the speed of said first object calculated by said calculator.

22. An information processing apparatus according to claim 14, wherein said information processor includes a determiner determining whether said moving object on said screen collides with a predetermined image on said screen.

23. An information processing apparatus according to claim 22, wherein said moving object on said screen is an image of a ball for a bowling game and said predetermined image on said screen is an image of a pin for the bowling game.

24. An information processing apparatus according to claim 1, further comprising a movable body rotatable in at least one of an elevation direction and a revolution direction, said imager, base unit and light source being accommodated in said movable body.

25. An information processing apparatus according to claim 1, wherein said first retroreflective body is provided in a transparent or semitransparent housing.

26. An information processing apparatus according to claim 1, wherein said first object is provided with a strap.

27. An information processing apparatus according to claim 1, wherein said first object is attached to a lower leg or an ankle of a player.

28. An information processing apparatus according to claim 27, wherein said application is for a soccer game.

29. An information processing apparatus according to claim 1, wherein said first object is in a form of a band.

30. An information processing apparatus according to claim 1, wherein said first object is in a form of a glove.

31. An information processing apparatus according to claim 1, wherein said first retroreflective body has a long-thin shape, and said calculator detects said first notable portion from said difference=and calculates at least one of an angle, position, moving speed and moving path pattern of said first object, and said information processor performs a sword battle game on the basis of said at least one of the angle, position, moving speed and moving path pattern of said first object calculated by said calculator.

32. An information processing apparatus according to claim 1, further comprising a second object including a second retroreflective body, wherein said imager images said second object at a light-emission and at a non-light-emission of said stroboscope to produce a plurality of image signals at light-emission and a plurality of image signals at non-light emission;

said calculator calculates a part or all of information of a position, a size, a velocity, an acceleration, a moving path pattern of said second object by detecting a second notable portion in correspondence to said second retroreflective body from difference between said image signal at light-emission and said image signal at non-light emission; and said information processor performs information processing according to an application on the basis of the information of the first object and the second object calculated based on said difference by said calculator to provide an output according to said application.

33. An information processing apparatus according to claim 32, wherein said first object is attached to a hand or wrist, or held by a hand of a player, and said second object is attached to a lower leg or ankle of said player.

34. An information processing apparatus according to claim 33, wherein said application is for a dance game.

35. An information processing apparatus according to claim 1, wherein said application is for any one of a bowling game, baseball game, table tennis game, tennis game, soccer game, boxing game, dance game and sword battle game.

36. A computer readable medium storing a program for an information processing apparatus provided with an input system utilizing a stroboscope which includes a light source outputting a light of a specific wavelength range;

a base unit which includes a supporting cylinder having an opening and a lens provided below said opening in said supporting cylinder; a filter provided so as to cover said opening of said supporting cylinder and passing only the light of said specific wavelength range; a first object including a first retroreflective body, wherein the light source is provided in the vicinity of said filter so as to light up said first object; and an imager which images the light passing through said filter, said program causing a processor of said information processing apparatus to execute:

an imaging step of imaging by said imager said first object at a light-emission and at a non-light-emission of said stroboscope to produce a plurality of image signals at light-emission and a plurality of image signals at non-light emission;

a first step of calculating a part or all of information of a position, a size, a velocity, an acceleration, a moving path pattern of said first object by detecting a first notable portion in correspondence to said first retroreflective body from a difference between said image signal at light-emission and said image signal at non-light emission; and a second step of performing information processing according to an application on the basis of the information calculated based on said difference by said first step to provide an output according to said application.

* * * * *